(12) United States Patent
Maeno et al.

(10) Patent No.: US 7,210,674 B2
(45) Date of Patent: May 1, 2007

(54) FLUID-FILLED VIBRATION DAMPING DEVICE

(75) Inventors: Hajime Maeno, Kasugai (JP); Atsushi Muramatsu, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 72 days.

(21) Appl. No.: 11/006,714

(22) Filed: Dec. 8, 2004

(65) Prior Publication Data

US 2005/0127586 A1 Jun. 16, 2005

(30) Foreign Application Priority Data

Dec. 12, 2003 (JP) .............................. 2003-415765

(51) Int. Cl.
| | |
|---|---|
| F16F 5/00 | (2006.01) |
| F16F 9/00 | (2006.01) |
| F16F 13/00 | (2006.01) |
| F16F 15/00 | (2006.01) |
| F16M 5/00 | (2006.01) |

(52) U.S. Cl. ............................. 267/140.13; 267/141.2
(58) Field of Classification Search ........... 267/140.11, 267/140.13, 141.2
See application file for complete search history.

(56) References Cited

U.S. PATENT DOCUMENTS

| | | | | |
|---|---|---|---|---|
| 5,167,403 A | * | 12/1992 | Muramatsu et al. | ... 267/140.13 |
| 5,246,212 A | * | 9/1993 | Funahashi et al. | ..... 267/140.13 |
| 5,314,173 A | | 5/1994 | Ide et al. | |
| 5,769,402 A | | 6/1998 | Ide et al. | |
| 5,839,720 A | | 11/1998 | Kojima | |
| 5,992,833 A | | 11/1999 | Tanahashi | |
| 2004/0188904 A1 | | 9/2004 | Hiroyuki et al. | |

FOREIGN PATENT DOCUMENTS

| | | | |
|---|---|---|---|
| DE | 10 2004 014 976 A1 | | 3/2005 |
| JP | 01-229132 A | | 9/1989 |
| JP | 04277338 | * | 10/1992 |
| JP | 2516487 B2 | | 4/1996 |
| JP | 2004-293666 | | 10/2004 |
| JP | 2004293666 | * | 10/2004 |

* cited by examiner

*Primary Examiner*—Devon Kramer
(74) *Attorney, Agent, or Firm*—Oliff & Berridge PLC

(57) ABSTRACT

A fluid-filled vibration damping device including: an elastic body connecting a first and a second mounting member, defining a pressure receiving chamber undergoing pressure fluctuation during input of vibration; an equilibrium chamber defined by a flexible layer for permitting its volume change; a first orifice passage connecting the pressure receiving chamber and equilibrium chamber; a medial chamber disposed between the pressure receiving chamber and equilibrium chamber; a second orifice connecting the pressure receiving and medial chambers, being tuned to a frequency higher than does the first orifice passage; a pressure fluctuation transmitting mechanism disposed between the pressure receiving and medial chambers for a restricted pressure transmission between chambers by restrictive displacement of its movable member; and a pressure regulating rubber plate defining the medial chamber, regulating pressure fluctuation in the medial chamber by its elastic deformation.

10 Claims, 12 Drawing Sheets

FLUID-FILLED VIBRATION DAMPING DEVICE

INCORPORATED BY REFERENCE

The disclosure of Japanese Patent Application No. 2003-415765 filed on Dec. 12, 2003 including the specification, drawings and abstract is incorporated herein by reference in its entirety.

BACKGROUND OF THE INVENTION

1. Field of the Invention

The present invention relates generally to vibration damping devices suitably used as an automobile engine mount, and the like, for example, and more particularly to an engine mount of novel construction, which is capable of advantageously exhibiting vibration damping effect with respect to various kinds of vibration, on the basis of flow action of the fluid sealed therein.

2. Description of the Related Art

A fluid-filled vibration damping device is known as one type of vibration dam ping device installed between two members constituting a vibration transmitting system, like an engine mount interposed between a body and a power unit of a automotive vehicle. Typically, a fluid-filled vibration damping device includes a pressure receiving chamber and an equilibrium chamber, which are both filled with non-compressible fluid, and an orifice passage for permitting a fluid communication between the pressure receiving chamber and the equilibrium chamber. Thus, the fluid-filled vibration damping device is able to exert vibration damping effect on the basis of flow action of the non-compressible fluid forced to flow through the orifice passage between two chambers during input of vibration.

There is known with respect to such a fluid-filled vibration damping device that the vibration damping effect on the basis of flow action of the non-compressible fluid is effective only to a relatively narrower vibration frequency range, which is previously tuned by suitably adjusting the length and the cross sectional area of the orifice passage.

Meanwhile, many vibration damping devices are required to exhibit vibration damping effect with respect to input vibration of a plurality of frequency ranges or alternatively over a wide frequency range. One proposed major to meet this end is disclosed in JP-B-2516487 wherein the fluid filled vibration damping device further includes a rubber elastic plate disposed in a partition wall partitioning the pressure receiving chamber and the equilibrium chamber from each other. With this arrangement, when subjected to input of vibration of frequency higher than the tuning frequency of the orifice passage, the vibration damping device is able to preventing increase in its dynamic spring constant by transmitting fluid pressure fluctuation in the pressure receiving chamber to the equilibrium chamber through elastic deformation of the rubber elastic plate, thereby providing enhanced vibration damping performance with respect to higher frequency vibration.

In the conventional fluid-filled vibration damping device of construction as disclosed in JP-B-2516487, while somewhat improvements are admitted in terms of vibration damping performance at a higher frequency range that is higher than the tuning frequency range of the orifice passage, the vibration damping performance exhibited by positively utilizing flow action of the fluid flowing through the orifice passage is only limited to low frequency and large amplitude vibration. Therefore, the conventional fluid-filled vibration damping device still ensures its advantageous damping effect only at a narrow frequency range, and is not able to exhibit satisfactory damping effect. For instance, while an engine mount for automotive vehicle is required to exhibit excellent vibration damping performance not only for vibration excited during running conditions, e.g., low frequency and large amplitude vibration, such as engine shakes, and high frequency small amplitude vibration such as booming noises, but for vibration excited during idling conditions, e.g., medium frequency and medium amplitude vibration corresponding to engine idling vibration, it is still difficult for the conventional fluid-filled vibration damping device to sufficiently achieve the required vibration damping performance.

SUMMARY OF THE INVENTION

It is therefore one object of this invention to provide a fluid-filled vibration damping device of novel construction, which is capable of exhibiting excellent vibration damping effect for vibration of a plurality of frequency ranges or over a wide frequency range, and is suitably utilized, for example, as an automotive engine mount.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides a fluid-filled vibration damping device comprising: (a) a first mounting member; (b) a second mounting member disposed spaced away from the first mounting member; (c) a rubber elastic body elastically connecting the first and second mounting members together; (d) a pressure receiving chamber partially defined by the rubber elastic body and filled with a non-compressible fluid, the pressure receiving chamber undergoing fluid pressure fluctuation during input of vibration to the device; (e) an equilibrium chamber partially defined by a flexible layer for permitting a volume change thereof and filled with the non-compressible fluid; (f) a first orifice passage permitting a fluid communication between the pressure receiving chamber and the equilibrium chamber, and being tuned to a first frequency range; (g) a medial chamber disposed between the pressure receiving chamber and the equilibrium chamber, and filled with the non-compressible fluid; (h) a second orifice passage permitting a fluid communication between the equilibrium chamber and the medial chamber, and being tuned to a second frequency range higher than the first frequency range; (i) a pressure fluctuation transmitting mechanism disposed between the pressure receiving chamber and the medial chamber for permitting a restricted pressure fluctuation transmission between the pressure receiving chamber and the medial chamber owing to restrictive displacement or deformation of a movable member thereof; and (j) a pressure regulating rubber plate partially defining the medial chamber and regulating fluid pressure fluctuation in the medial chamber owing to an elastic deformation thereof.

In the fluid-filled vibration damping device of construction according to the first mode of the invention, operation of the pressure fluctuation transmitting mechanism and a pressure regulating rubber plate makes it possible to suitably regulate characteristics in terms of transmission of pressure fluctuation excited in the pressure receiving chamber during input of vibration to the medial chamber, and pressure absorbing characteristics of the medial chamber. This arrangement permits suitable regulation of flowing conditions of the fluid through the first and second orifice passages, performance of the medial chamber for absorbing fluid pressure fluctuation excited in the pressure receiving chamber, and the like. Thus, the fluid filled vibration damping device of this mode is able to exhibit excellent vibration damping effect with respect to various frequency vibration extending over a wide frequency range.

Since the first and second orifice passages are tuned respective frequency ranges different from each other, the fluid-filled vibration damping device is capable of providing effective vibration damping performance with respect to vibrations of different frequencies, on the basis of resonance action of the fluid flowing through the first orifice passage, and resonance action of the fluid flowing through the second orifice passage, respectively. Upon application of high frequency vibration having frequency higher than the tuning frequencies of the first and second orifice passages, fluid pressure fluctuation excited in the pressure receiving chamber will be transmitted to the medial chamber through the pressure fluctuation transmitting mechanism. This fluid pressure fluctuation transmitted to the medial chamber will be absorbed by means of elastic deformation of the pressure regulating rubber plate, thereby providing good vibration damping performance with respect to input vibration of high frequency.

Accordingly, the fluid-filled vibration damping device of this mode of the invention is able to provide further enhanced vibration damping performance with respect to input vibration ranging over more wider frequency range or ranging from more variable frequency ranges, than does the conventional fluid filled vibration damping device such as that disclosed in the aforementioned Patent Publication, JP-B-2516487.

A second mode of the present invention provides a fluid-filled vibration damping device according to the above described first mode, wherein the movable member of the pressure fluctuation transmitting mechanism comprises a movable plate member of plane shape, the movable plate member being disposed between the pressure receiving chamber and the medial chamber such that an amount of displacement of the movable plate member in a thickness direction thereof is restricted, and fluid pressure in the pressure receiving chamber is exerted on a first surface of the movable plate member while fluid pressure in the medial chamber is exerted on an other surface of the movable plate member.

According to the fluid-filled vibration damping device of this mode, the fluid pressure fluctuation excited in the pressure receiving chamber is exerted on the medial chamber owing to displacement of the movable plate member in its thickness direction. With this arrangement, resistance to displacement of the movable plate member may be sufficiently minimized within a region where the displacement of the movable plate member is permitted. In comparison with the case where the movable member of the pressure fluctuation transmitting mechanism is constituted by a rubber plate member that is supported at its peripheral portion and undergoes elastic deformation at its central portion in order to transmit the fluid pressure fluctuation from the pressure receiving chamber and the medial chamber, the use of the movable plate member makes it possible to transmit the fluid pressure fluctuation excited in the pressure receiving chamber to the medial chamber with high efficiency, even in the case where the amplitude of input vibration is relatively small. In addition, the amount of displacement of the movable plate member is limited, so that a volume of fluid pressure fluctuation released from the pressure receiving chamber to the medial chamber will be surely restricted. Thus, unnecessary relief of the fluid pressure from the pressure-receiving chamber may be prevented.

Described in detail, when subjected to vibration having frequency within the frequency range of the first orifice passage, the fluid-filled vibration damping device is able to excite effective fluid pressure fluctuation in the pressure receiving chamber, and provide a sufficient amount of flow of the fluid through the first orifice passage, thereby exhibiting excellent vibration damping effect with respect to input vibration. On the other hand, when subjected to vibration having frequency within the frequency range of the second orifice passage, the fluid-filled vibration damping device is able to excite vibration damping effect with respect to input vibration, based on flow action of the fluid through the second orifice passage caused by efficient fluid pressure transmission from the pressure receiving chamber to the medial chamber. Further, when subjected to vibration having frequency higher than the frequency range of the second orifice passage, the fluid filled vibration damping device is able to excite vibration damping effect on the basis of elastic deformation of the pressure regulating rubber plate caused by efficient fluid pressure transmission from the pressure receiving chamber to the medial chamber, efficiently.

A third mode of the invention provides a fluid-filled vibration damping device according to the above described first mode or second mode, wherein the equilibrium chamber is situated on a side opposite from the medial chamber with the pressure regulating rubber plate partially defining the medial chamber interposed therebetween.

According to the fluid-filled vibration damping device of this mode of the invention, upon application of higher frequency and small amplitude vibration to the device, fluid pressure fluctuation released from the pressure receiving chamber to the medial chamber through the pressure fluctuation transmitting mechanism is further released to the equilibrium chamber through elastic deformation of the pressure regulating rubber plate. Furthermore, partitioning walls of the medial chamber on the side of pressure receiving chamber and the equilibrium chamber may be formed by utilizing the pressure fluctuation transmitting mechanism and the pressure regulating rubber plate, respectively. This makes it possible to make the fluid-filled vibration damping device simple in construction and compact in overall size.

A fourth mode of the present invention provides a fluid-filled vibration damping device according to the above described first mode or second mode, wherein the pressure regulating rubber plate partially defining the medial chamber is exposed to an atmosphere at a surface thereof opposite from the medial chamber.

In the fluid filled vibration damping device according to this mode of the invention, when subjected to vibration having small amplitude and high frequency higher than that of the tuning frequencies of the first and second orifice passages, fluid pressure fluctuation released from the pressure receiving chamber to the medial chamber through the pressure fluctuation transmitting mechanism is further released to the atmosphere through elastic deformation of the pressure regulating rubber plate.

A fifth mode of the present invention provide a fluid-filled vibration damping device according to any one of the above described first, second and fourth modes, further comprising a working air chamber situated on a side opposite from the medial chamber with the pressure regulating rubber plate partially defining the medial chamber interposed therebetween.

The fluid-filled vibration damping device of construction according to this mode is suitable for providing the following seventh and eighth modes of the invention.

A sixth mode of the present invention provide a fluid-filled vibration damping device according to the above described fifth mode, further comprising an air passage connected to the working air chamber, and an air pressure regulating apparatus externally regulate air pressure in the working air chamber via the air passage.

The fluid-filled vibration damping device of construction according to this mode is suitable for providing the following seventh and eighth modes of the invention, for example.

A seventh mode of the present invention provide a fluid-filled vibration damping device according to the above described sixth mode, wherein the air pressure regulating apparatus includes static pressure varying device for variably setting spring characteristics of the pressure regulating rubber plate by regulating a static pressure level in the working air chamber.

According to this mode of the invention, the static pressure varying device is operable to increase the spring stiffness of the pressure regulating rubber plate so as to minimize or eliminate pressure absorbing action of the medial chamber based on elastic deformation of the pressure regulating rubber plate, or alternatively is operable to soften the spring stiffness of the pressure regulating rubber plate so as to enhance pressure absorbing action of the medial chamber based on elastic deformation of the pressure regulating rubber plate. For instance, the static pressure varying device is operated, during input of vibration of frequency corresponding to the tuning frequency of the second orifice passage, to apply a large level of negative or positive pressure to the working air chamber. As a result, an restricting force is exerted on the pressure regulating rubber plate, whereby a sufficient amount of flow of the fluid through the second orifice passage is obtained, thus making it possible to exhibit enhanced vibration damping effect on the basis of flow action of the fluid flowing through the second orifice passage. During input of vibration of frequency higher than the tuning frequency of the second orifice passage, on the other hand, the static pressure varying device is operated to expose the working air chamber to the atmosphere. As a result, the restricting force exerted on the pressure regulating rubber plate is minimized or released, whereby fluid pressure fluctuation transmitted from the pressure-receiving chamber to the medial chamber through the pressure fluctuation transmitting mechanism will be absorbed by elastic deformation of the pressure regulating rubber plate, thus making it possible to minimize or avoid deterioration of vibration damping performance of the device due to high dynamic spring constant of the device.

An eighth mode of the present invention provides a fluid-filled vibration damping device according to the above described sixth mode or seventh mode wherein the air pressure regulating apparatus includes an active pressure regulating device for applying active air pressure fluctuation to the working air chamber by regulating active air pressure level in the working air chamber and thereby oscillating the pressure regulating rubber plate.

According to the fluid-filled vibration damping device of this mode, the active pressure regulating device is able to regulate air pressure fluctuation in the working air chamber while taking into account a frequency and phase of vibration to be damped, whereby fluid pressure in the medial chamber may be actively regulated via the pressure regulating rubber plate. By desirably regulating the fluid pressure in the medial chamber, fluid pressure fluctuation transmitted from the pressure receiving chamber to the medial chamber may be absorbed, or alternatively, fluid pressure fluctuation excited in the medial chamber may be exerted on the pressure receiving chamber through the pressure fluctuation transmitting mechanism. That is, the fluid-filled vibration damping device of this mode is able to actively or positively regulate fluid pressure fluctuation in the pressure-receiving chamber, thereby exhibiting active vibration damping effect with respect to input vibration or canceling the input vibration.

A ninth mode of the present invention provide a fluid-filled vibration damping device according to any one of the above described first through eighth modes, wherein said vibration damping device is adapted to undergo input of at least three kinds of vibration including low frequency and high amplitude vibration, medium frequency and medium amplitude vibration, high frequency and small amplitude vibration, wherein the first orifice passage is tuned to the low frequency and large amplitude vibration so that the vibration damping device exhibits vibration damping effect with respect to the low frequency and large amplitude vibration on the basis of flow action of the fluid flowing through the first orifice passage, wherein the pressure fluctuation transmitting mechanism is tuned to the medium frequency and medium amplitude vibration so that fluid pressure fluctuation excited in the pressure receiving chamber during input of the medium frequency and medium amplitude vibration is transmitted to the medial chamber, while the fluid pressure fluctuation excited in the pressure receiving chamber during input of the low frequency and large amplitude vibration is not transmitted to and released to the medial chamber, wherein the second orifice passage is tuned to the medium frequency and medium amplitude vibration so that the vibration damping device exhibits vibration damping effect with respect to the medium frequency and medium amplitude vibration on the basis of flow action of the fluid flowing through the second orifice passage, and wherein the pressure regulating rubber plate is tuned to the high frequency and small amplitude vibration so that fluid pressure fluctuation transmitted from the pressure receiving chamber to the medial chamber through the pressure fluctuation transmitting mechanism during input of high frequency and small amplitude vibration is absorbed due to elastic deformation of the pressure regulating rubber plate, while the fluid pressure fluctuation transmitted from the pressure receiving chamber to the medial chamber through the pressure fluctuation transmitting mechanism during input of medium frequency and medium amplitude vibration is not absorbed and not released from the medial chamber since the elastic deformation of the pressure regulating rubber plate is restricted.

The fluid-filled vibration damping device of construction according to this mode of the invention is capable of exhibiting vibration damping effect with respect to low frequency and large amplitude vibration on the basis of resonance action of the fluid flowing through the first orifice passage, and exhibiting vibration isolating effect with respect to medium frequency and medium amplitude vibration on the basis of resonance action of the fluid flowing through the second orifice passage, while exhibiting vibration isolating effect with respect to high frequency and small amplitude vibration on the basis of elastic deformation of the pressure regulating rubber plate. In order to isolate high frequency and small amplitude vibration, for example, the working air chamber may be exposed to the atmosphere so that the fluid-filled vibration damping device is able to exhibit passive vibration damping effect on the basis of effect of low dynamic spring constant owing to fluid pressure absorbing action of the pressure regulating rubber plate, or alternatively the working air chamber may be applied with air pressure fluctuation corresponding to vibration to be damped so that the fluid-filled vibration damping device is able to exhibit active vibration damping effect on the basis of oscillating elastic deformation of the pressure regulating rubber plate.

A tenth mode of the present invention provides a fluid-filled vibration damping device according to the above described ninth mode, wherein the vibration damping device is provided for use as an engine mount for an automotive vehicle, and one of the first and second fixing member is adapted to be fixed to an power unit of the vehicle, while an other of the first and second mounting members is adapted to be fixed to a body of the vehicle, and wherein the low frequency and large amplitude vibration includes engine shake, the medium frequency and medium amplitude vibration includes engine idling vibration, and the high frequency and small amplitude vibration includes booming noises.

The fluid-filled vibration damping device of construction according to this mode is suitable for providing an engine mount for an automotive vehicle, and is able to exhibit excellent vibration damping effect with respect to engine shakes, booming noises as well as engine idling vibration.

An eleventh mode of the present invention provides a fluid-filled vibration damping device according to any one of the above described first through tenth modes of the invention, wherein the second mounting member is of cylindrical tubular configuration, the first mounting member is situated on a side of one open end of the second mounting member with a spacing therebetween, the rubber elastic body is disposed between and elastically connects the first and second mounting member with the one open end of the second mounting member fluid-tightly closed by means of the rubber elastic body, an other open end of the second mounting member is fluid-tightly closed by the flexible layer, the partition member is supported by the second mounting member to be situated between the rubber elastic body and the flexible layer so that the pressure receiving chamber is defined between the partition member and the rubber elastic body while the equilibrium chamber is defined between the partition member and the flexible layer, the medial chamber is formed within the partition member, the partition member at least partially defines the first orifice passage and the second orifice passage, and the pressure fluctuation transmitting mechanism and the pressure regulating rubber plate are incorporated with the partition member.

In the fluid-filled vibration damping device of construction according to this mode, the pressure receiving chamber, the medial chamber and the equilibrium chamber are arranged within the tubular second mounting member in series in an axial direction of the second mounting member with excellent space utilization. Thus, the fluid-filled vibration damping device of this mode may be made compact overall.

As will be understood from the foregoing description, the fluid-filled vibration damping device of construction according to the present invention is able to provide a sufficient amount of flow of the fluid through the first orifice passage and the second orifice passage at respective tuning frequency range thereof, by suitably adjusting characteristics of fluid pressure transmitting mechanism and the pressure regulating rubber plate. With this arrangement, the vibration damping performances of the device on the basis of flow action of the fluid flowing through the first and second orifice passages are effectively exhibiting with respect to different frequency vibrations. In addition, upon application of vibration having frequency higher than the tuning frequencies of the first and second orifice passages, the fluid-filled vibration damping device is able to provide effective vibration damping performance by passively or actively regulating fluid pressure fluctuation transmitted from the pressure receiving chamber to the medial chamber by means of pressure regulating rubber plate.

Accordingly, the fluid-filled vibration damping device of the present invention is capable of exhibiting effective vibration damping performance with respect to three or more kinds of vibrations having different frequencies or vibrations over a wide frequency range. Therefore, the present fluid-filled vibration damping device may be suitably applied to an engine mount for use in an automotive vehicle, thereby providing required vibration damping performance with high preciseness.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
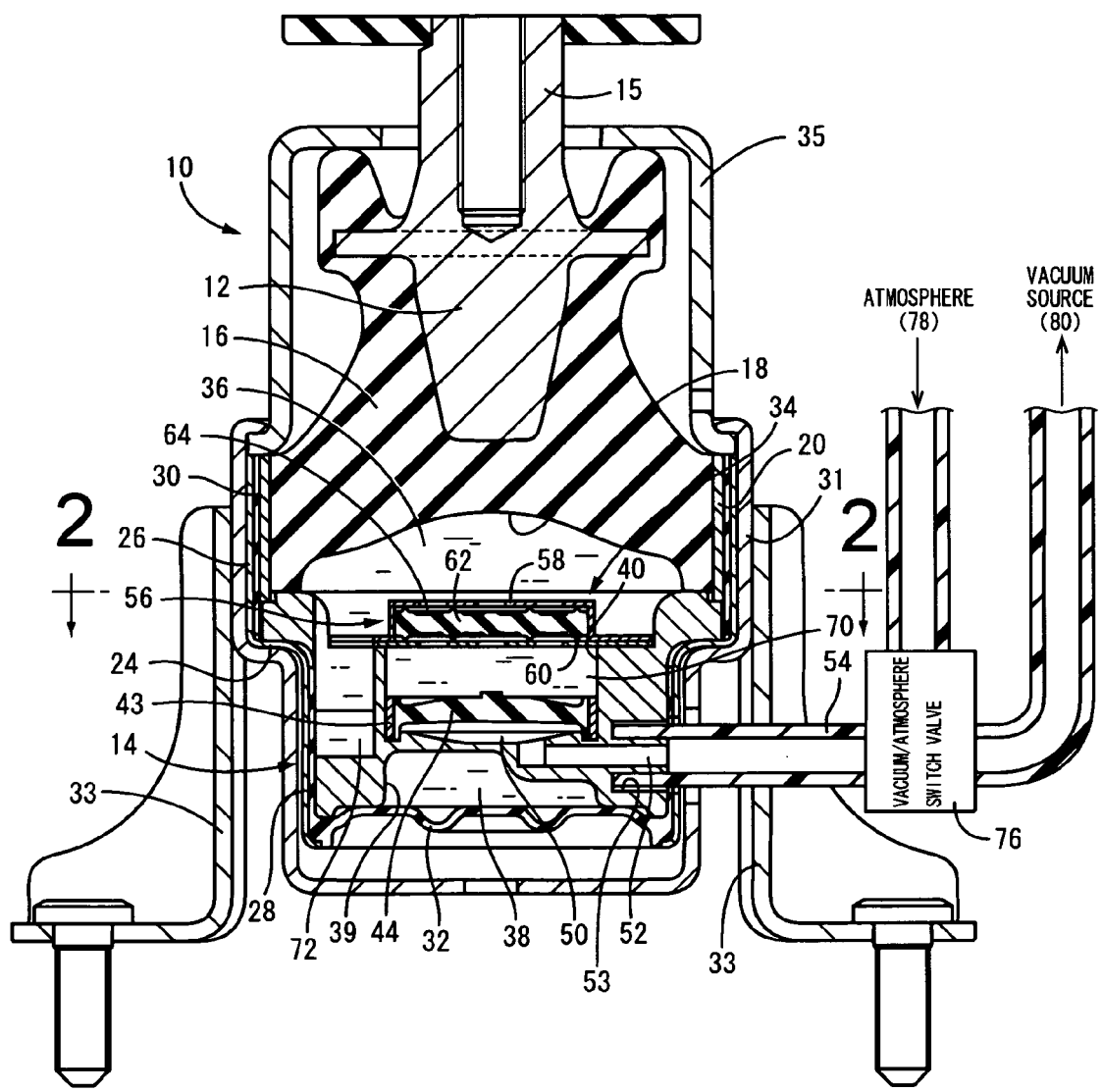
FIG. 1 is an elevational view in axial or vertical cross section of an automotive engine mount of construction according to a first embodiment of a fluid filled vibration damping device of the present invention, which is taken along line 1—1 of FIG. 2.
Figure 2:
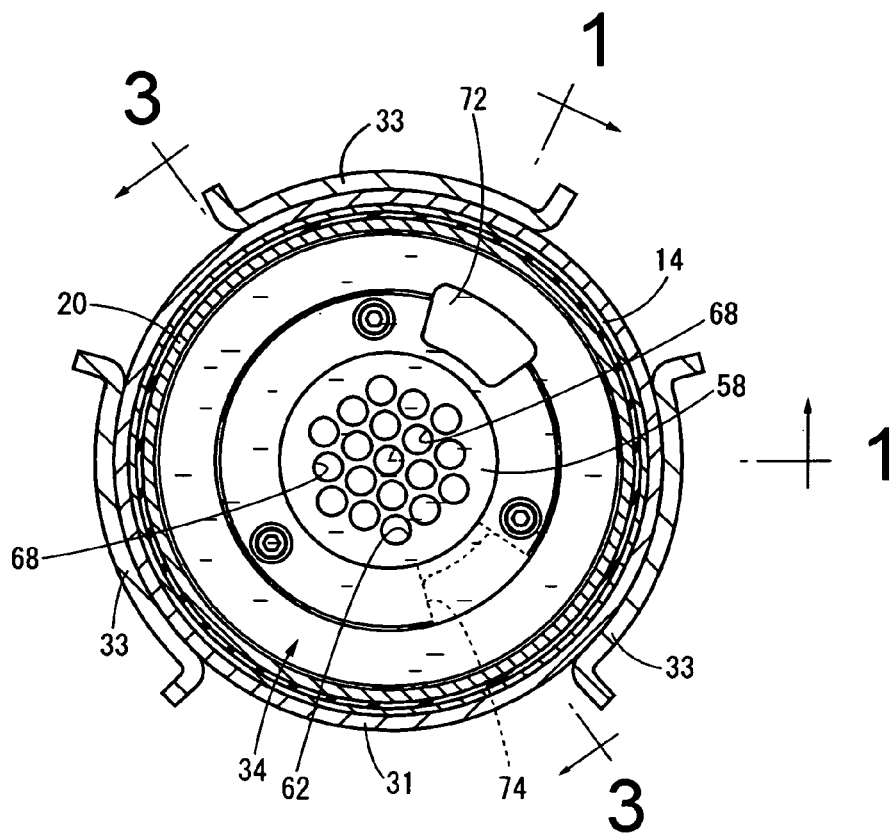
FIG. 2 is a cross sectional view taken along line 2—2 of FIG. 1.
Figure 3:
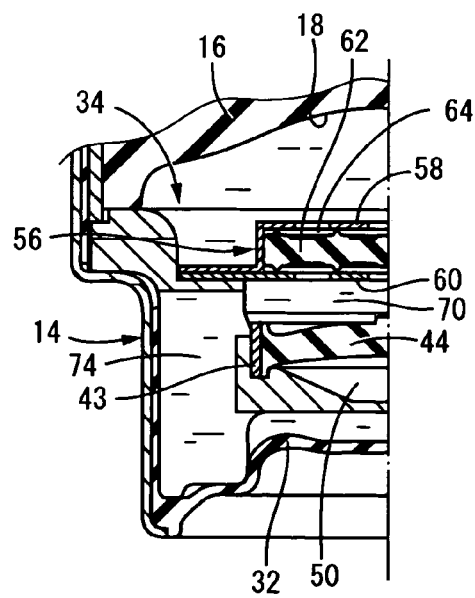
FIG. 3 is a cross sectional view taken along line 3—3 of FIG. 2.

Referring first to FIGS. 1–3, shown is an engine mount 10 for an automotive vehicle, having construction according to a first embodiment of a fluid-filled vibration damping device of the present invention. The engine mount 10 includes a first mounting member 12 of metal, a second mounting member 14 of metal, and an rubber elastic body 16 by which are elastically connected the first mounting member 12 and the second mounting member 14 disposed spaced away from each other. While it is not depicted in the drawings, the engine mount 10 is installed on the vehicle such that the first mounting member 12 is fixed to the power unit side of the vehicle, while the second mounting member 14 is fixed to the body side of the vehicle, whereby the engine mount 10 fixedly supports the power unit on the body of the vehicle in a vibration damping fashion, like conventional engine mounts. In the following description, the vertical direction of the engine mount 10 shall be conformed to the vertical direction as seen in FIG. 1, which direction approximately corresponds to a primary input direction of vibration to be damped.

More specifically, the first mounting member 12 is of a generally inverted frustoconical configuration, and includes a nut portion 15 integrally formed at a large diameter end portion so as to protrude axially upwardly. By means of a mounting bolt (not shown) to be thread-engaged into a tapped hole formed through the nut portion 15, the first mounting member 12 is attached to the power unit side of the vehicle.

To the first mounting member 12, the rubber elastic body 16 is bonded through vulcanization of a rubber material for forming the rubber elastic body 16 (hereinafter referred to simply as "vulcanization" where appropriate). The rubber elastic body 16 has a generally frustoconical configuration overall, with a relatively large diameter gradually increasing as its goes axially downwardly, and is formed with a recess 18 of inverted motor shape, which is open in a large diameter end face of the rubber elastic body 16. The first mounting member 12 is concentrically disposed with and bonded by vulcanization to the rubber elastic body 16 with the first mounting member 12 protruded axially downward into the rubber elastic body 16 from a small diameter end face of the rubber elastic body 16. A metallic sleeve 20 of large-diameter tubular configuration is superimposed and bonded by vulcanization onto an outer circumferential surface of the large diameter end portion of the rubber elastic body 16.

The second mounting member 14 is of a generally stepped tubular configuration having a relatively large diameter. The second mounting member 14 includes a shoulder portion 24 formed at an axially intermediate portion thereof, a large diameter portion 26 on the axially upper side and a small diameter portion 28 on the axially lower side. A thin sealing rubber layer 30 is bonded through vulcanization of a rubber material for forming thereof to inner circumferential surfaces of the large diameter portion 26 and the small diameter portion 28, thereby coating substantially entire area of the inner circumferential surfaces of the respective portions 26 and 28. On the side of the small diameter portion 28 of the second mounting member 14, there is provided a flexible layer in the form of a thin-disk shaped flexible diaphragm 32 made of a thin rubber layer, with its peripheral portion bonded through vulcanization of a rubber material for forming thereof to the opening peripheral edge of the second mounting member 14. Thus, the lower open end of the second mounting member 14 is closed with fluid tightness. In this embodiment, the flexible diaphragm 32 is integrally formed with the thin sealing rubber layer 30, and functions as a flexible layer.

The second mounting member 14 of construction as described above is externally fitted at its large diameter portion 26 onto the metallic sleeve 20, and secured thereon by pressing, drawing or other possible fixing process, whereby the second mounting member 14 is bonded onto the outer circumferential surface of the rubber elastic body 16. Thus, the first mounting member and the second mounting member are generally concentrically disposed with a common axis thereof extends along a primary vibration input direction in which vibration to be damped are applied to the engine mount 10, and are spaced away from each other in the primary vibration input direction, and are elastically connected to each other by the rubber elastic body 16. With the large diameter portion 26 of the second mounting member 14 bonded to the rubber elastic body 16, the upper open end of the second mounting member 15 is closed with fluid-tightness.

The second mounting member 14 is sheathed into a generally tubular cup shaped bracket 31 having an inside diameter some what greater than an outside diameter of the second mounting member, and fixedly assembled therewith. A plurality of legs 33 are fixed by welding to an outer circumferential surface of the bracket 31, and extend axially downwardly. With the plurality of legs 33 fixed to the body of the vehicle by means of bolts, the second mounting member 14 are fixedly mounted onto the body of the vehicle. It should be noted that in order to permit an expansive deformation of the diaphragm 32, a sufficient volume of space is formed between the floor of the bracket 31 and the diaphragm 32, while being open to the atmosphere via a through hole formed through the floor of the bracket 31. To the upper open end of the bracket 31, a metallic tubular stop member 35 is fixed by caulking so as to extend axially upwardly. This stop member 35 is brought into abutting contact with the first mounting member via a rubber member bonded onto the upper end face of the large diameter portion of the first mounting member 12, whereby an amount of displacement between the first mounting member 12 and the second mounting member in the axial spaced away direction (i.e., in a so-called "rebound direction") is restricted in a cushion wise manner.

A partition member 34 is housed within the small-diameter portion 28 of the second mounting member 14 such that the partition member 34 is disposed between the rubber elastic body 16 and the flexible diaphragm 32. This partition member 34 is a generally thick disk block member made of metal, synthetic resin material, or other suitable rigid materials. The partition member 34 is forcedly fitted into the small diameter portion 28 of the second mounting member 14, for example by press fitting the partition member 34 into the small diameter portion 28 or by drawing the small diameter portion 28 onto the partition member 34 disposed therein, whereby an outer circumferential surface of the partition member 34 is fluid-tightly fixed onto the small diameter portion 28 with the sealing rubber layer 30 compressed therebetween. With the partition member 34 assembled with the second mounting member 14 as described above, a region defined by and between the rubber elastic body 16 and the diaphragm 32 and fluid-tightly closed up from the external area is partitioned with fluid-tightness into two areas. Namely, on the axially upper side of the partition member 34 is formed a pressure receiving chamber in the form of a primary fluid chamber 36 partially defined by the rubber elastic body 16 and functioning as a pressure-receiving chamber, and on the axially lower side of the partition member 34 is formed an equilibrium chamber 38 partially defined by the flexible diaphragm 32 and having a volume valuable based on the deformation of the flexible diaphragm 32.

The primary fluid chamber 36 and the equilibrium chamber 38 are both filled with a non-compressible fluid such as water, alkylene glycol, polyalkylene glycol and silicone oil. For effective damping performance based on resonance of the fluid, which will be described in detail later, it is preferable to employ a low-viscosity fluid whose viscosity is not higher than 0.1 Pa.s. It should be noted that the partition member 34 includes a lower recess 39 open in a central portion of its axially lower end face, whereby a volume of the equilibrium chamber 38 is effectively obtained with the-presence of the lower recess 39.

The partition member 34 further includes a central recess 40 open in a central portion of its axially upper end face. In this central recess 40, there is disposed a pressure regulating rubber plate in the form of a rubber elastic plate 44. The rubber elastic plate 44 is a thin-disk shaped member with given thickness and bonded at its peripheral portion to a fixing ring 43 disposed about thereof, through vulcanization of a rubber material for forming thereof. This fixing ring 43 is press fitted into the central recess 40, whereby the rubber elastic plate 44 is situated near the floor of the central recess 40, extending in its axis-perpendicular direction. With this arrangement, the central recess 40 is fluid-tightly partitioned at the portion near its bottom, to thereby form a working air chamber 50 defined by and between the rubber elastic layer 44 and the floor surface of the central recess 40, which is fluid tightly separated from the primary fluid chamber 36 and the equilibrium chamber 38.

An air passage 52 is formed into the partition member 34, such that one open end of the air passage 52 is open to the working air chamber 50, and the other open end of the air passage 52 is connected to a port 53 open in the outer circumferential surface of the partition member 34. This port 53 is exposed to the external area through windows formed through the second mounting member 14 and the bracket 31.

When the engine mount 10 is installed on the vehicle, the port 53 is connected to an external air conduit 54, whereby an air pressure in the working air chamber may be adjustable from the external area through the air conduit 54 and the air passage 52.

On the upper face of the partition member 34, there is disposed a pressure fluctuation transmitting mechanism 56. This pressure fluctuation transmitting mechanism 56 includes an upper support plate 58, a lower support plate 60, and a movable plate member in the form of a movable rubber plate 62. More specifically, the thin upper support plate 58 having a hut-like configuration is superimposed on the thin lower support plate 60, whereby the lower open end of the upper support plate 58 is closed by means of the lower support plate 60, thereby providing a support housing having a restricted accommodation space 64 defined therein. The upper and lower support plates are both formed with a plurality of communication holes 68 perforated through their thickness at their central portions defining the restricted accommodation space 64.

The movable rubber plate 62 is housed within the restricted accommodation space 64 formed between the upper and lower support plates 58, 60. This movable rubber plate 62 has a thickness dimension smaller than an inside height dimension of the restricted accommodation space 64, and an outside diameter dimension smaller than an inside diameter dimension of the restricted accommodation space 64, so that the movable rubber plate 62 is housed within the restricted accommodation space 64 in an axially movable manner. An amount of the displacement of the movable rubber plate 62 in the axial or its thickness direction is limited within a given amount by means of abutting contact thereof against the upper and lower support plates 58, 60.

The pressure fluctuation transmitting mechanism 56 of construction as described above is superimposed onto the upper face of the partition member 34 such that mutually tightly laminated upper and lower support plates 58, 60 are bolted at their outer peripheral portions to the partition member 34. With this state, the opening of the central recess 40 is covered by the pressure fluctuation transmitting mechanism 56, while the restricted accommodation space 64 is situated axially above the opening of the central recess 40.

That is, the pressure fluctuation transmitting mechanism 56 defines a part of the wall of the primary fluid chamber 36, and a medial chamber 70 is defined within the central recess 40 on the axially opposite side from the primary fluid chamber 36 with the pressure fluctuation transmitting mechanism 56 situated therebetween. More specifically, the medial chamber 70 is formed within the central recess 40 and defined by and between the pressure fluctuation transmitting mechanism 56 and the rubber elastic plate 44. The non-compressible fluid is also filled within the medial chamber 70. In this pressure fluctuation transmitting mechanism 56, fluid flows between the primary fluid chamber 36 and the medial chamber 70 through the communication holes 68 formed through the upper and lower support plates 58, 60, are permitted by means of displacement of the movable rubber plate 62 in the axial direction within the restricted accommodation space 64, thereby executing pressure fluctuation transmission between two chambers 36 and 70. With this regards, the amount of pressure fluctuation to be transmitted may be restricted as a result of the above-described restriction of the displacement amount of the movable rubber plate 62 by means of abutting contact of the movable rubber plate 62 against the upper and lower support plate 58, 60.

The partition member 34 at least partially defines a first orifice passage 72 and the second orifice passage 74. For the first orifice passage 72, the partition member 34 is formed with a circumferential groove extending in its circumferential direction of a circumferential length slightly smaller than that of its circumference, while being open in its outer circumferential surface. The opening of this circumferential groove is fluid-tightly closed by the second mounting member 14, thereby providing the first orifice passage 72 that is held in fluid communication with the primary fluid chamber 36 at one end open in the upper face of the partition member 34, and held in fluid communication with the equilibrium chamber 38 at the other end open in the lower face of the partition member 34. Namely, the first orifice passage 72 permits a mutual fluid communication between the primary fluid chamber 36 and the equilibrium chamber 38.

For the second orifice passage 74, the partition member 34 is also formed with an axial groove open in its outer circumferential surface and extending in its axial direction from the axially medial portion to the lower edge portion. The opening of the axial groove is fluid-tightly closed by the second mounting member 14, thereby providing the second orifice passage 74 that is held in fluid communication with the medial chamber 70 at one end of radially inwardly extending tunnel shape open to the medial chamber 70, and held in fluid communication with the equilibrium chamber 38 at the other end open downward. Namely, the second orifice passage 74 permits a mutually fluid communication between the medial chamber 70 and the equilibrium chamber 38.

In the present embodiment, the first orifice passage 72 is tuned to a first frequency range, namely is tuned to be effective with respect to a low frequency range at around 10 Hz corresponding to engine shakes or the like, so that the engine mount 10 is capable of exhibiting excellent anti-vibration effect (high damping effect) on the basis of resonance of the fluid flowing through the first orifice passage 72.

The second orifice passage 74, on the other hand, is tuned to a second frequency range, namely tuned to effective with respect to a medium frequency range at around 20–40 Hz corresponding to engine idling vibration or the like, so that the engine mount 10 is capable of exhibiting excellent anti-vibration effect (vibration isolating effect due to low dynamic spring constant) on the basis of resonance of the fluid flowing through the first orifice passage.

The tuning of the first and second orifice passages 72, 74 may be attained by suitably adjusting the length and cross sectional area of each passage while taking into account the wall spring stiffness of each of the primary, equilibrium and medial chambers 36, 38, 70 or the like, where meant by the "wall spring stiffness" is a characteristic value corresponding to an pressure fluctuation amount required to undergo deformation of the wall by unit volume. Generally, a frequency to which is tuned the first orifice passage 72 or the second orifice passage 74 may be recognized as a frequency at which a phase of the fluid pressure fluctuation of fluid flowing through the first orifice passage 72 or the second orifice passage 74 is changed and generate a substantially resonance state of the fluid.

With the engine mount 10 of above-described construction installed on the vehicle, an external air conduit 54 is connected to the port 53 of the air passage 52 formed in the partition member 34. A switch valve 76 is connected at a portion of the air conduit 54 so that the working air chamber 50 is held in communication with the switch valve 76 via the air conduit 54. The switch valve 76 may be a solenoid-operated valve or the like, and is operable for alternatively connecting and disconnecting the working air chamber 50 to and from an atmosphere 78 and a vacuum source 80. By suitably controlling switching operation of the switch valve 76 depending upon vehicle driving conditions or the like, the engine mount 10 is able to provide excellent damping effect with respect to various vibration applied thereto under various conditions. In this embodiment, the switch valve 76, the atmosphere 78, the vacuum source 80, and the air conduit 54 cooperate to provide an air pressure regulating apparatus.

Figure 4:
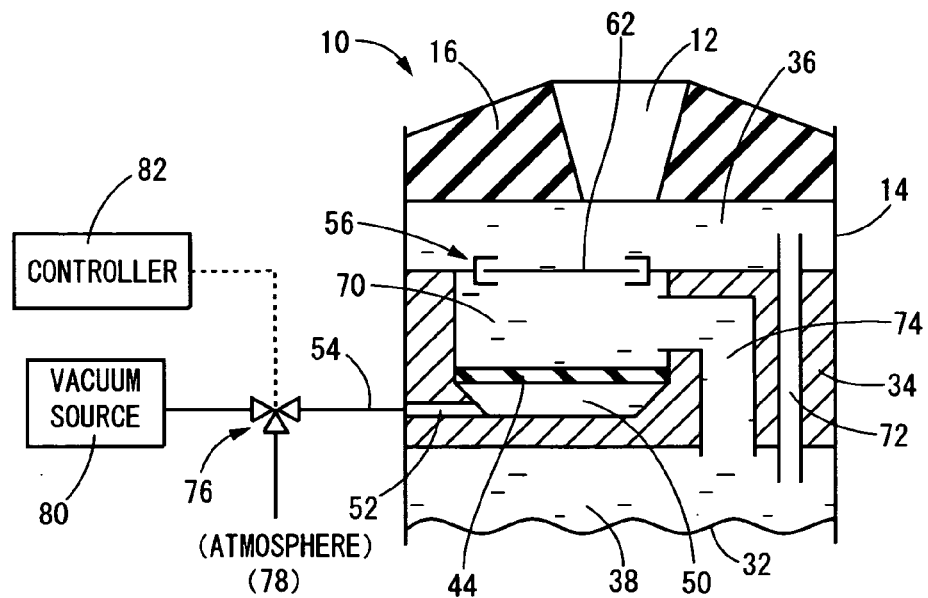
FIG. 4 is a schematic view showing a functional structure of the engine mount of FIG. 1.

Referring to FIG. 4, schematically shown is a construction of the engine mount 10 of the present embodiment. In FIG. 4, 82 denotes a switching operation controller. The switching operation controller 82 is adapted to receive from various kinds of sensing members equipped with the vehicle input of required signals selected from among various sensing signals representing conditions of the vehicle, such as a vehicle speed, an engine speed, a currently selected shift lever position, and a throttle opening angle, while it is not depicted in the drawings. Based on these input signals, the switching operation controller 82 executes control of switching operation of the switch valve 76 according to a predetermined control program, utilizing software or the like installed on a micro computer thereof.

Hereinafter, there will be described specific operations of the engine mount 10 for damping three kinds of vibration to be damped: (a) engine shakes of low frequency and large amplitude vibration; (b) engine idling vibration of medium frequency and medium amplitude vibration; and (c) booming noises of high frequency and small amplitude vibration, by way of example, and damping effects for these three kinds of vibration in detail.

(a) Vibration Damping Effect for Engine Shakes

When the engine mount 10 is subjected to input of engine shakes or other low frequency and large amplitude vibration, the primary fluid chamber 36 undergoes fluid pressure fluctuation having a considerably large amplitude. This huge fluid pressure fluctuation generates displacement of the movable rubber plate 62 of the pressure fluctuation transmitting mechanism 56. However, an amount of displacement of the movable rubber plate 62 is limited to a predetermined travel range so that the fluid pressure fluctuation induced in the primary fluid chamber 36 is not effectively absorbed by means of the limited displacement of the movable rubber plate 62. Thus, during input of the engine shakes or the like, the pressure fluctuation transmitting mechanism 56 is not able to actually operat, so that the huge fluid pressure fluctuation induced in the primary fluid chamber 36 is hardly transmitted to the medial chamber 70 via the pressure fluctuation transmitting mechanism 56.

Figure 5:
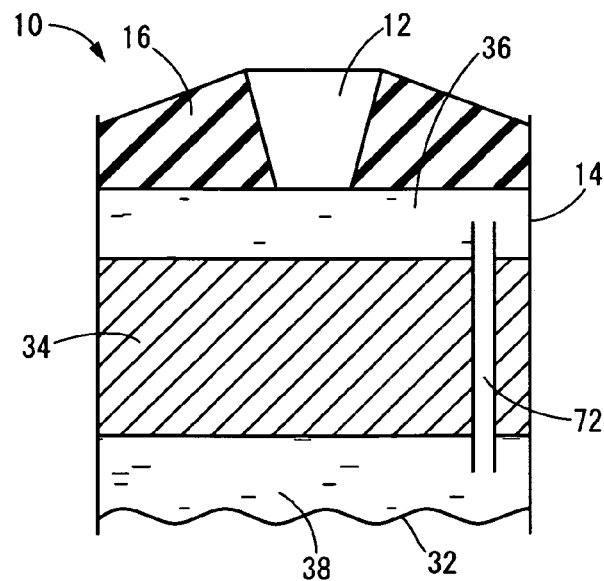
FIG. 5 is a schematic view showing a functional structure for providing vibration damping performance with respect to low frequency large amplitude vibration in the engine mount of FIG. 1.

That is, during input of low frequency and large amplitude vibration, the pressure fluctuation transmitting mechanism 56 and the medial chamber 70 are substantially held in non-functional condition, so that fluid flow through the second orifice passage 74 is hardly induced. FIG. 5 shows schematically a functional construction of the engine mount 10 in this state.

Described in detail, the engine mount 10 in the state for damping engine shakes as discussed above is functionally constructed such that a fluid communication between the primary fluid chamber 36 undergoing vibration input and the equilibrium chamber 38 of valuable volume is permitted through the first orifice passage 72 tuned to the low frequency range. With this state, relative fluid pressure fluctuation between the primary fluid chamber 36 and the equilibrium chamber 38 induced during input of vibration will cause a sufficient amount of flow of fluid through the first orifice passage 72 between the two chambers 36, 38, making it possible to exhibit advantageous anti-vibration effect (high damping effect) with respect to low frequency and large amplitude vibration. It should be appreciated that since the medial chamber 70 is held in substantially non-functional condition, this vibration damping effect with respect to low frequency and large amplitude vibration is not influenced depending on whether the working air chamber 50 is connected to the atmosphere 78 or the vacuum source 80.

Vibration damping characteristics of the engine mount 10 with respect to low frequency and large amplitude vibration were actually measured in terms of absolute dynamic complex spring constant K1 and damping coefficient C1. Obtained measurements are demonstrated in the graph of FIG. 6. As is understood from the graph of FIG. 6, the engine mount 10 exhibits high damping coefficient C1 at a frequency range corresponding to the engine shakes.

(b) Vibration Damping Effect for Engine Idling Vibration

When the engine mount 10 is subjected to input of engine idling vibration or other medium frequency and medium amplitude vibration, the primary fluid chamber 36 undergoes fluid pressure fluctuation having a certain extent of amplitude. This certain extent of fluid pressure fluctuation generates suitable displacement of the movable rubber plate 62 of the pressure fluctuation transmitting mechanism 56 so that the fluid pressure fluctuation induced in the primary fluid chamber 36 is effectively transmitted to the medial chamber 70. Thus, during input of medium frequency and medium amplitude vibration, the pressure fluctuation transmitting mechanism 56 is effectively operated, so that the fluid pressure fluctuation induced in the primary fluid chamber 36 is transmitted to the medial chamber 70 via the pressure fluctuation transmitting mechanism 56, thereby exciting fluid pressure fluctuation in the medial chamber 70.

Figure 7:
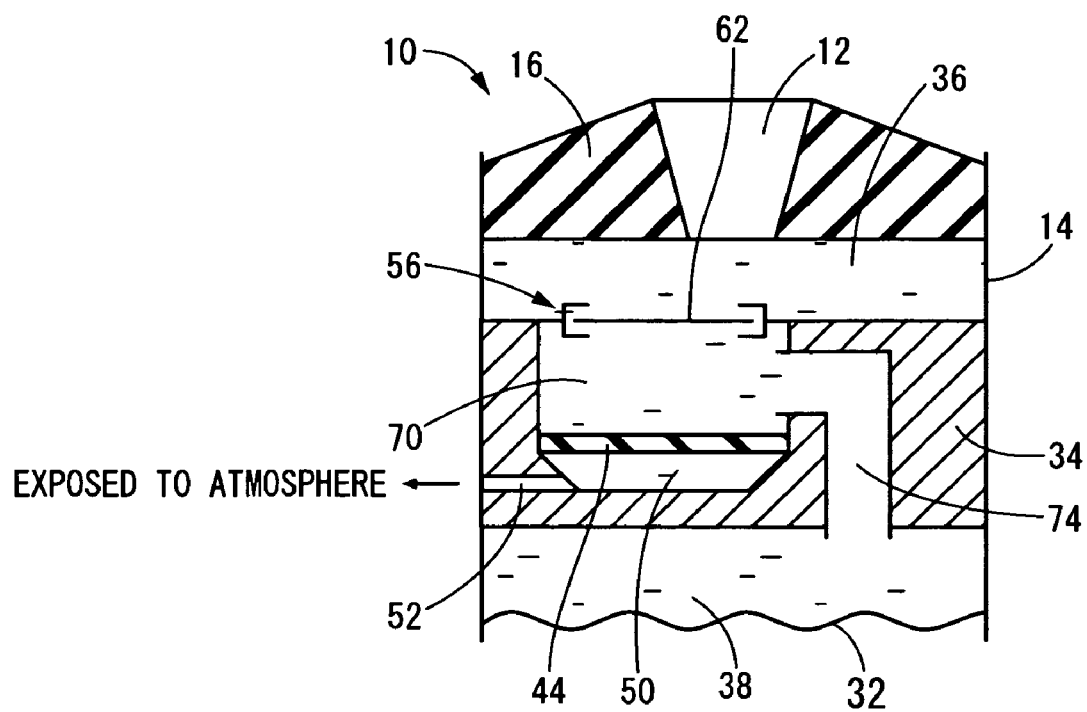
FIG. 7 is a schematic view showing a functional structure for providing vibration damping performance with respect to medium frequency medium amplitude vibration in the engine mount of FIG. 1.

In the state where the engine mount 10 is subjected to input of medium frequency and medium amplitude vibration, since the first orifice passage 72 is tuned to the frequency range lower than that of input vibration, resistance to flow of the fluid through the first orifice passage will increase considerably due to anti resonance action of the fluid, whereby the first orifice passage 72 is held in substantially closed state. FIG. 7 shows schematically a functional construction of the engine mount 10 in this state.

Described in detail, the engine mount 10 in the state for damping engine idling vibration as discussed above is functionally constructed such that a fluid communication between the medial chamber 70 exciting effective fluid pressure fluctuation like in the primary fluid chamber 36 and the equilibrium chamber 38 of valuable volume is permitted through the second orifice passage 74 tuned to the medium frequency range. With this state, relative fluid pressure fluctuation between the medial chamber 70 together with the primary fluid chamber 36 and the equilibrium chamber 38 induced during input of vibration will cause a sufficient amount of flow of fluid through the second orifice passage 74 between the two chambers 36, 38, making it possible to exhibit advantageous anti-vibration effect (vibration isolating effect on the basis of low dynamic spring constant) with respect to medium frequency and medium amplitude vibration, such as engine idling vibration.

It this state, the spring characteristics of the rubber elastic plate 44 partially defining the wall of the medial chamber 70 is changed depending on whether the working air chamber 50 is connected to the atmosphere 78 or the vacuum source 80. Namely, when the working air chamber 50 is connected to the atmosphere 78, the rubber elastic plate 44 is held in a non restricted state as shown in FIG. 7, thereby exhibiting soft spring characteristics. On the other hand, when the working air chamber 50 is connected to the vacuum source 80, the rubber elastic plate 44 undergoes elastic deformation toward the working air chamber 50 by means of vacuum attraction, and is forcedly attracted whereby the rubber elastic plate 44 is held in abutting contact with the lower face of the central recess 40 of the partition member 34. With this state, the rubber elastic plate 44 is inhibited in its elastic deformation, thereby exhibiting rigid spring characteristics. That is, the wall spring stiffness of the medial chamber 70 will change depending on whether the working air chamber 50 is connected to the atmosphere 78 or the vacuum source 80, thereby changing the tuning frequency of the second orifice passage 74 accordingly. Thus, the engine mount 10 is able to change target frequency of its vibration damping performance. As will be understood from the foregoing description, the rubber elastic plate 44 exhibits spring characteristics that is not softer than does the flexible diaphragm 32, and exhibits a certain extent of spring stiffness enough to induce sufficient fluid pressure fluctuation in the medial chamber 70, whereby a sufficient amount of flow of the fluid through the second orifice passage 74, while inhibiting absorption by its elastic deformation of fluid pressure fluctuation induced in the medial chamber 70 during input of engine idling vibration or other medium frequency and medium amplitude vibration. In this embodiment, the switch valve 76, the atmosphere 78, the vacuum source 80, and the air conduit 54 cooperate to provide an static pressure varying device.

For instance, the working air chamber 50 is alternatively connected to the atmosphere 78 and the vacuum source 80, by means of switching operation of the switch valve 76, depending on whether the vehicle is in a normal engine idling condition or a so-called first idling condition including a startup of the engine or and a running of an air conditioner. This makes it possible to alternatively tune with higher accuracy the second orifice passage 74 to different idling vibration having respective medium frequency ranges different from each other by a few or a few dozen of Hz, thereby permitting the engine mount 10 to exhibit further improved vibration damping effect.

Vibration damping characteristics of the engine mount 10 with respect to medium frequency and medium amplitude vibration were actually measured in terms of absolute value of complex spring constant K2 and damping coefficient C2 for the case where the working air chamber 50 is connected to the atmosphere 78, and in terms of absolute value of complex spring constant K3 and damping coefficient C3 for the case where the working air chamber 50 is connected to the vacuum source 80. Obtained measurements are demonstrated in the graph of FIG. 6. As is understood from the graph of FIG. 6, the engine mount 10 is capable of suitably adjusting a frequency of its low dynamic spring constant by alternatively connecting the working air chamber 50 to the atmosphere 78 and the vacuum source 80, within an idling frequency range, whereby the engine mount 10 is able to exhibit sophisticated vibration damping effect for medium frequency and medium amplitude vibration.

It should be noted that it is not an essential feature of the present invention to vary the tuning frequency of the second orifice passage 74 by changing operating position of the switch valve 76 depending on the driving conditions of the vehicle. The principle of the present invention may be otherwise achieved, for example, such that the working air chamber 50 is always connected to the vacuum source 80 during input of engine idling vibration, provided an amount of fluctuation of engine idling vibration be relatively small, or the like, and the second orifice passage 74 is tuned so as to exhibit effective vibration damping effect with respect to the engine idling vibration. This arrangement was actually applied to the engine mount 10, and vibration damping characteristics of the engine mount 10 with respect to medium frequency and medium amplitude vibration were actually measured in terms of absolute value of complex spring constant K4. Obtained measurements are demonstrated in the graph of FIG. 6.

(c) Vibration Damping Effect for Booming Noises

When the engine mount 10 is subjected to input of booming noises or other high frequency and small amplitude vibration, the primary fluid chamber 36 undergoes fluid pressure fluctuation having small amplitude. This small amplitude fluid pressure fluctuation generates suitable displacement of the movable rubber plate 62 of the pressure fluctuation transmitting mechanism 56 so that the fluid pressure fluctuation induced in the primary fluid chamber 36 is effectively transmitted to the medial chamber 70. Thus, during input of medium frequency and medium amplitude vibration, the pressure fluctuation transmitting mechanism 56 is effectively operated, so that the fluid pressure fluctuation induced in the primary fluid chamber 36 is transmitted to the medial chamber 70 via the pressure fluctuation transmitting mechanism 56, and thus resealed.

Figure 9:
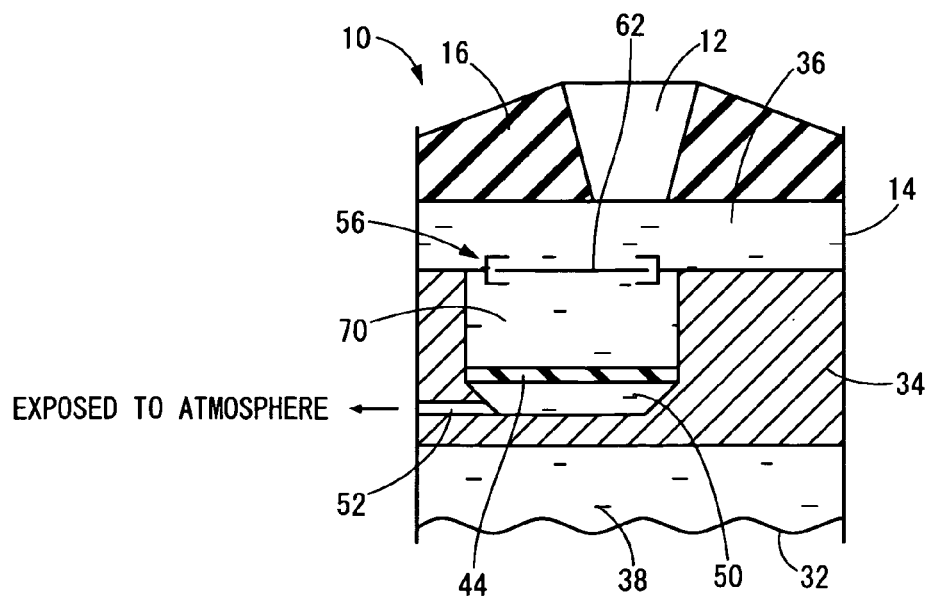
FIG. 9 is a schematic view showing a functional structure for providing vibration damping performance with respect to high frequency short amplitude vibration in the engine mount of FIG. 1.

In the state where the engine mount 10 is subjected to input of high frequency and high amplitude vibration, since the first orifice passage 72 and the second orifice passage 74 are tuned to the frequency range lower than that of input vibration, resistance to flow of the fluid through the first and second orifice passages 72, 74 will increase considerably due to anti resonance action of the fluid, whereby the first and second orifice passages 72, 74 are held in substantially closed state. FIG. 9 shows schematically a functional construction of the engine mount 10 in this state.

Described in detail, the engine mount 10 in the state for damping booming noises as discussed above is functionally constructed such that the primary fluid chamber 36 and the medial chamber 70 to which the fluid pressure fluctuation of the primary fluid chamber 36 is released, are both substantially isolated or closed from the equilibrium chamber 38. However, the rubber elastic plate 44 partially defining the wall of the medial chamber 70 at one face thereof, is opposed to the working air chamber 50 at the other face thereof, and thus exposed to the atmosphere. This arrangement permits a relatively readily elastic deformation of the rubber elastic plate 44. In particular, to the rubber elastic plate 44 is given a soft spring characteristics enough to sufficiently absorb fluid pressure fluctuation induced in the medial chamber 70 during input of booming noises or other high frequency and small amplitude vibration by its elastic deformation.

With this arrangement, the fluid pressure fluctuation induced in the primary fluid chamber 36 during input of vibration and transmitted to the medial chamber 70 is effectively absorbed by means of the elastic deformation of the rubber elastic plate 44 in the medial chamber 70. As a result, the engine mount 10 is able to avoid or moderate a phenomenon of high dynamic spring constant due to the substantial close of the first and second orifice passages 72, 74, thus exhibiting excellent vibration damping effect (vibration isolating effect on the basis of low spring constant) with respect to high frequency and small amplitude vibration.

Figure 6:
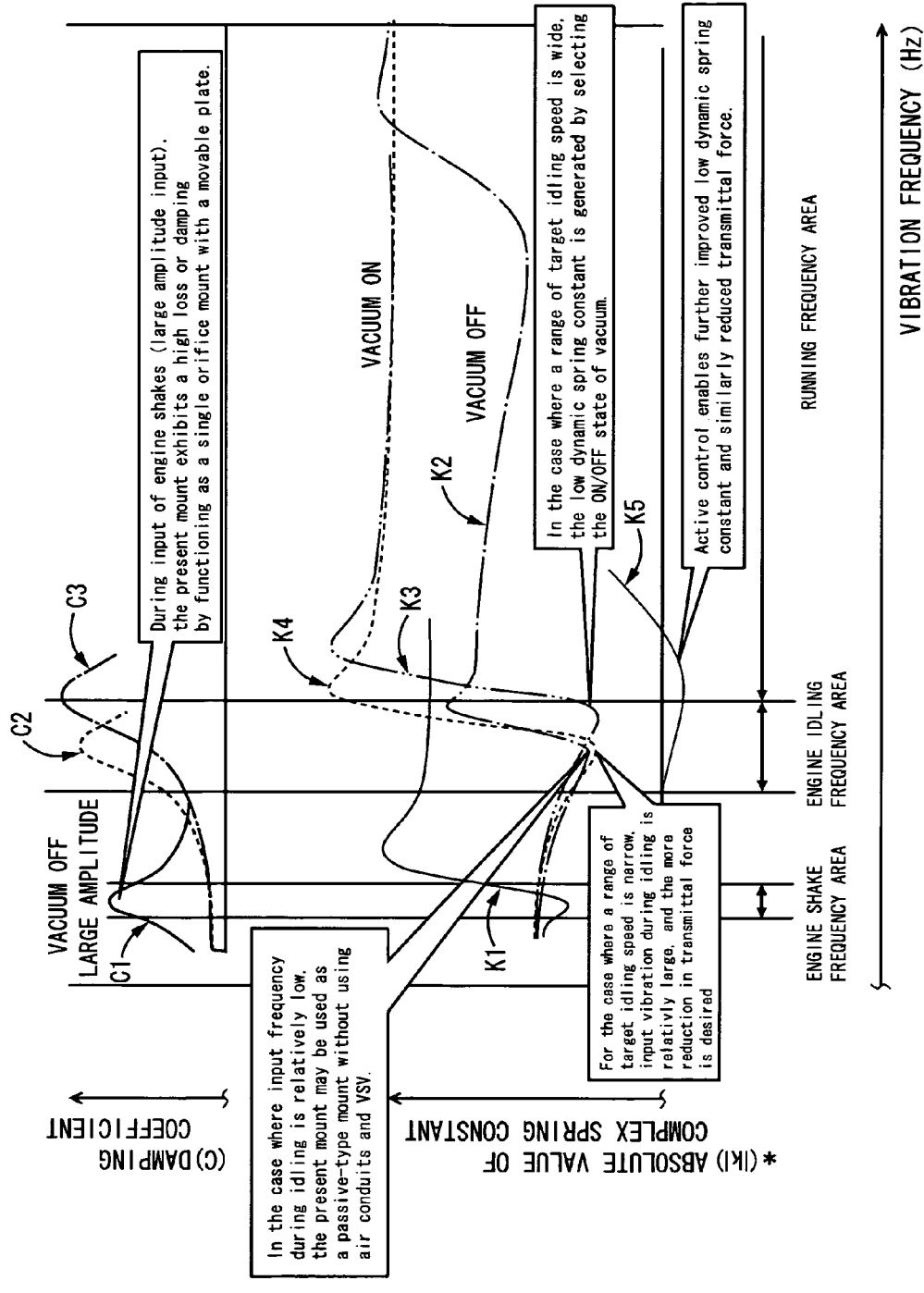
FIG. 6 is a graph showing vibration damping characteristics of the engine mount of FIG. 1 in terms of frequency characteristics of damping coefficient and absolute value of complex spring constant of the engine mount of FIG. 1.

Vibration damping characteristics of the engine mount 10 in a booming noise frequency area were actually measured in terms of absolute value of complex spring constant K2 and damping coefficient C2 with the working air chamber 50 connected to the atmosphere 78. Obtained measurements are demonstrated in the graph of FIG. 6. For reference, with the working air chamber 50 connected to the vacuum source 78 for inhibiting displacement of the rubber elastic plate 44, vibration damping characteristics of the engine mount 10 in the booming noise frequency area were also actually measured in terms of absolute value of complex spring constant K3 or K4, and obtained measurements are shown in the graph of FIG. 6. In the graph of FIG. 6, the difference between the absolute value of complex spring constants K2 and K3 or K4 represents an effect of low dynamic spring constant based on absorption of fluid pressure fluctuation in the medial chamber 70 by means of elastic deformation of the rubber elastic plate 44.

As will be understood from the foregoing description, the engine mount 10 of construction according to the present embodiment is capable of exhibiting excellent vibration damping effect with respect to all of low frequency and large amplitude vibration, medium frequency and medium amplitude vibration, and high frequency and small amplitude vibration, by suitably controlling operating position of the switch valve 76 depending on vehicle driving conditions.

Figure 8:
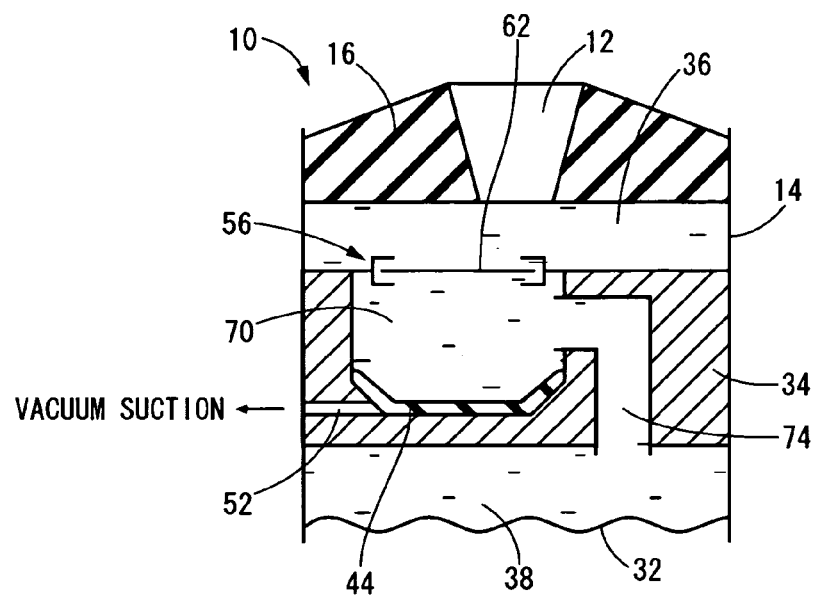
FIG. 8 is a schematic view showing another functional structure for providing vibration damping performance with respect to medium frequency medium amplitude vibration in the engine mount of FIG. 1.
Figure 10:
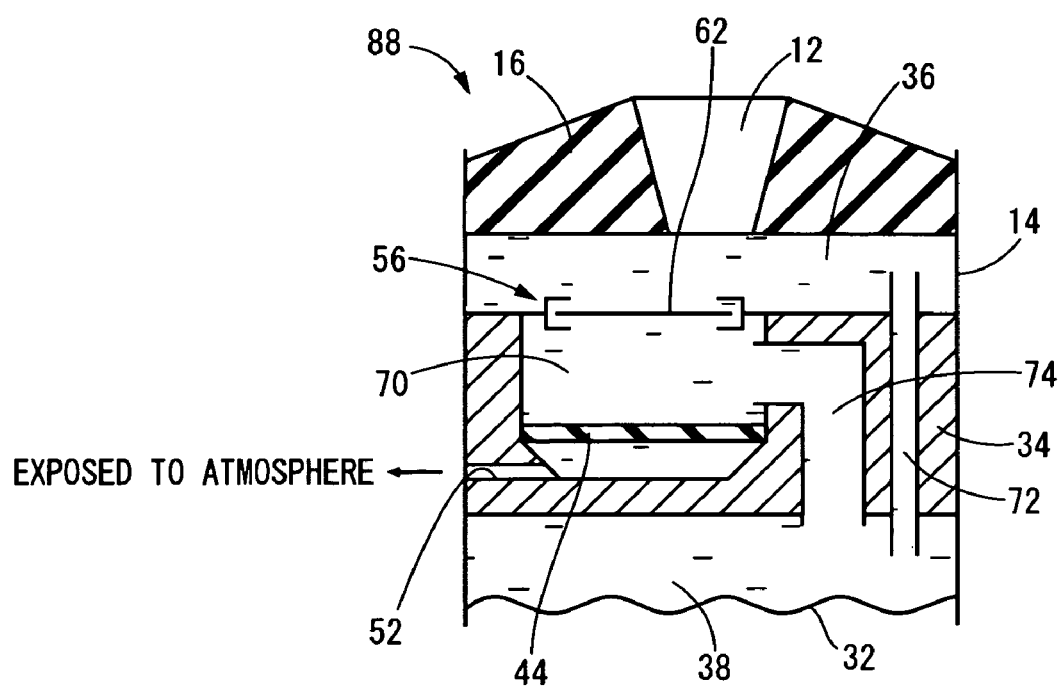
FIG. 10 is a schematic view corresponding to FIG. 4, showing a functional structure of an automotive engine mount of construction according to a second embodiment of the invention.

According to the first embodiment of the invention, the vibration damping characteristics of the engine mount 10 may be changed by alternatively connecting the working air chamber 50 to the atmosphere 78 and the vacuum source 80. The present invention is not limited to the constructions of the first embodiment. For instance, FIG. 10 schematically shows engine mount 88 according to a second embodiment of the invention whose construction is basically identical with that of the first embodiment. While the working air chamber 50 is always exposed to the atmosphere through the air passage 52, the engine mount 88 of the second embodiment is able to exhibit excellent vibration damping effect with respect to all of low frequency and large amplitude vibration, medium frequency and medium amplitude vibration, and high frequency and small amplitude vibration, as is apparent from the foregoing description. Namely, in the second embodiment, the engine mount 88 does not performs operation as shown in FIG. 8 only, but performs operation as shown in FIG. 7 during engine idling operation of the vehicle. Therefore, at the idling vibration frequency area, the engine mount 88 is able to exhibit effect of low dynamic spring constant owing to the second orifice passage 77, as evidenced by the absolute value of dynamic spring constant K4 shown in the graph of FIG. 6.

Figure 11:
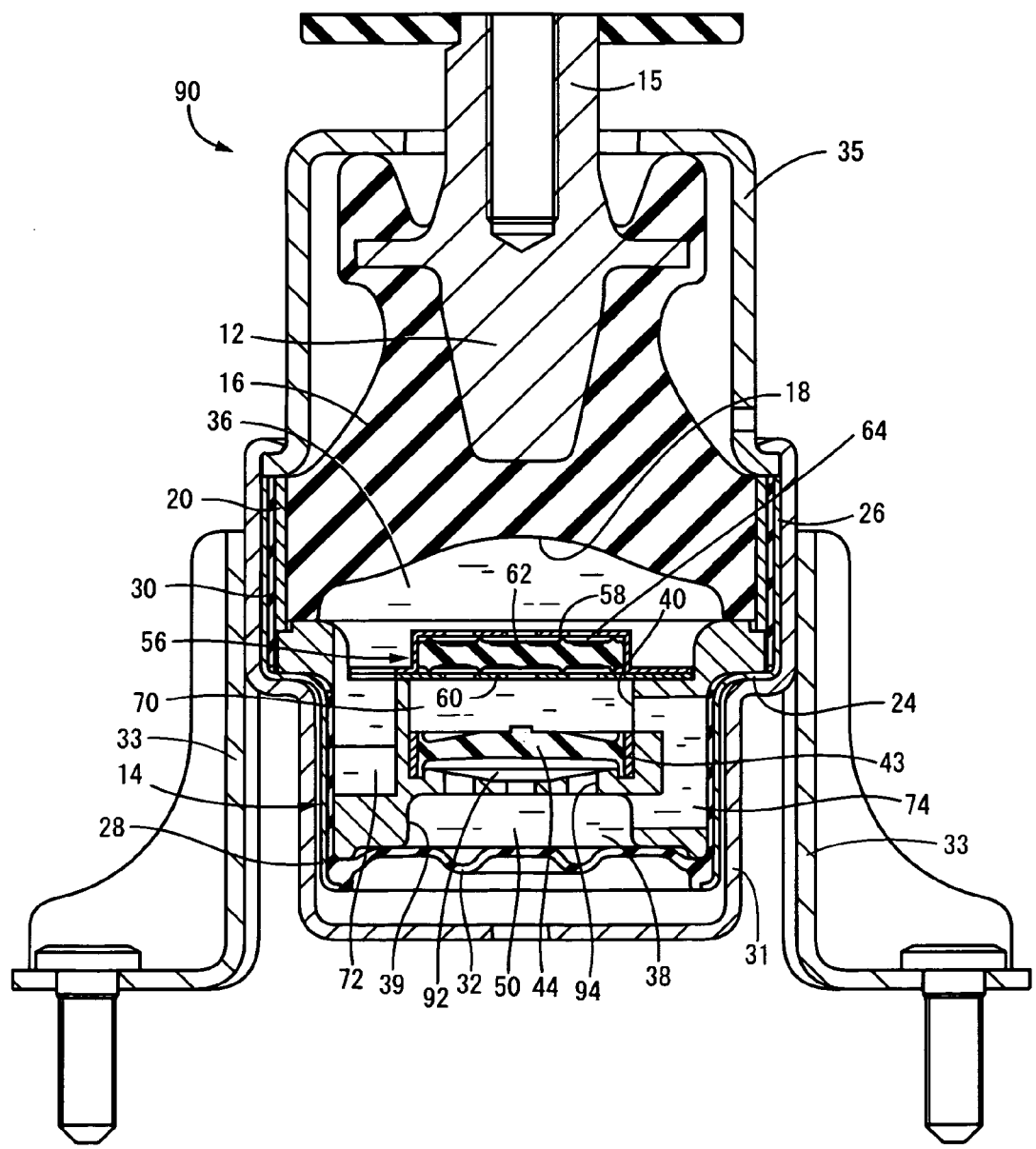
FIG. 11 is an elevational view in axial or vertical cross section of an automotive engine mount of construction according to a third embodiment of a fluid-filled vibration damping device of the present invention.

Referring next to FIG. 11, there is shown an engine mount 90 constructed according to a third embodiment of the present invention. The same reference numerals as used in the first embodiment will be used in this embodiment to identify the structurally or functionally corresponding components, and no redundant description of these components will be provided.

Figure 12:
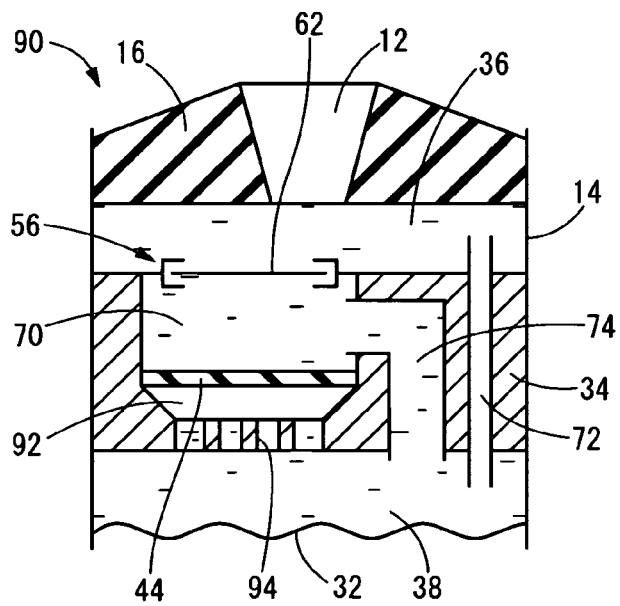
FIG. 12 is a schematic view showing a functional structure of the engine mount of FIG. 11.

In the engine mount 90, instead of the working air chamber 50 in the first embodiment, a region 92 situated behind the medial chamber 70 with the rubber elastic plate 44 interposed therebetween, is held in fluid communication with the equilibrium chamber 38 through a plurality of communication hole perforated through the top wall of the lower recess 39, whereby the region 92 substantially constitute a part of the equilibrium chamber 38. FIG. 12 shows schematic construction of the engine mount 90 constructed as described above.

In the engine mount 90 of the present invention, elastic deformation of the rubber elastic plate 44, which partially define the wall of the medial chamber 70, is permitted by means of equilibrium chamber 38 situated behind (lower side in FIG. 11) thereof. Therefore, the engine mount 90 is able to exhibit the substantially same damping effect as in the engine mount 88 of the second embodiment shown in FIG. 10.

Figure 13:
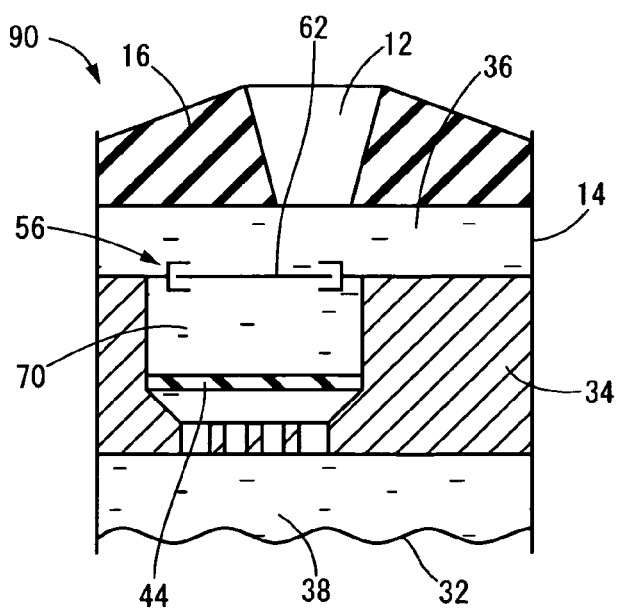
FIG. 13 is a schematic view showing a functional structure for providing vibration damping performance with respect to high frequency short amplitude vibration in the engine mount of FIG. 11.

That is, the engine mount 90 will provide a functional construction for low frequency and large amplitude vibration, which is identical with that shown in FIG. 5. For medium frequency and medium amplitude vibration, the engine mount 90 will provide a functional construction as shown in FIG. 13, which is substantially equivalent to those shown in FIGS. 7 and 10. For high frequency and small amplitude vibration, the engine mount 90 will provide a functional construction identical with that shown in FIG. 9.

Figure 14:
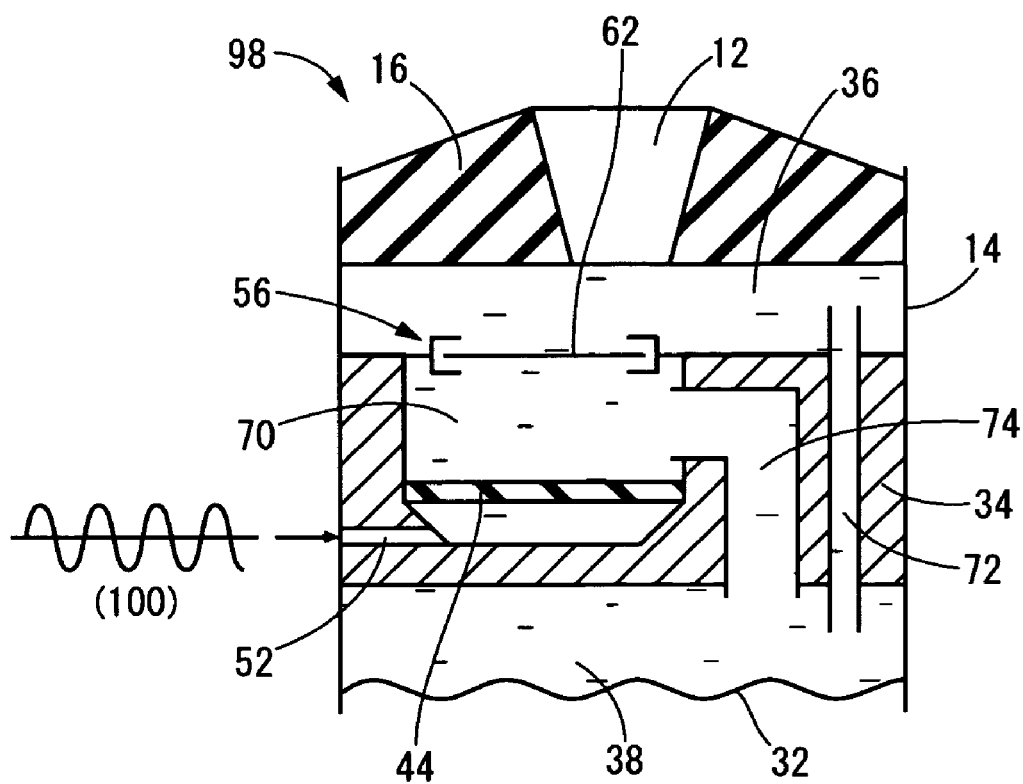
FIG. 14 is a schematic view corresponding to FIG. 4, showing a functional structure of an automotive engine mount of construction according to a fourth embodiment of the invention.

Referring next to FIG. 14, shown is an engine mount 98 according to a fourth embodiment of the invention, where a functional construction thereof is schematically depicted. In this embodiment, as well, the same reference numerals as used in the first embodiment will be used in this embodiment to identify the structurally or functionally corresponding components, and no redundant description of these components will be provided.

According to the engine mount 98 of the present embodiment, active air pressure fluctuation is applied from the outside to the working air chamber 50 formed behind the medial chamber 70 and opposed to the medial 70 with the rubber elastic plate 44 interposed therebetween. The active or dynamic air pressure fluctuation may be applied to the working air chamber 50, for example, such that the switching operation controller 82 generates a control signal having a phase corresponding to vibration to be damped based on ignition pulse signals or other input signals corresponding to vibration to be damped, and operates the switch valve 76 based on the control signal for alternatively connecting working air chamber 50 to the atmosphere 78 and the vacuum source 80 at high speed. In this respect, the vacuum source 80 may be provided by using a vacuum pump, or alternatively by utilizing negative pressure available from air intake system of an internal combustion engine of the vehicle. The negative pressure may be stored in an accumulator or other devices.

Namely, the active air pressure fluctuation to be applied to the working air chamber 50 has a frequency and phase corresponding to those of the target vibration to be damped. This active air pressure fluctuation corresponding to the target vibration is applied to the working air chamber, whereby the rubber elastic plate 44 undergoes positive or active elastic deformation thereof based on the air pressure fluctuation applied to the working air chamber 50. With this arrangement, fluid pressure in the medial chamber 70 will be actively controlled, and is exerted on the primary fluid chamber 38 through the pressure fluctuation transmitting mechanism 56, thus making it possible to positively or actively control fluid pressure in the primary fluid chamber 36. In this embodiment, the switch valve 76, the atmosphere 78, the vacuum source 80, and the air conduit 54 cooperate to provide an active pressure regulating device.

According to the present embodiment, the engine mount 98 is capable of exhibiting active vibration damping effect. For instance, the engine mount 98 is able to perform a so-called "zero spring" by canceling fluid pressure fluctuation induced in the primary fluid chamber 36 due to input vibration, in which the engine mount 98 exhibits an absolute value of dynamic spring constant K5 as shown in the graph of FIG. 6. That is, the illustrated engine mounts 10, 88, 90 according to the first through third embodiments, are all of passive type that perform passive vibration damping effects. Especially in the engine mount 10 of the first embodiment, the switching operation controller 82 and the switch valve 76 are both utilized to regulate passive pressure level in the working air chamber 50. In other words, the switching operation controller 82 and the switch valve 76 are cooperate to provide a static pressure switching mechanism in the engine mount 10 of the first embodiment. On the other hand, in the engine mount 98 of the present embodiment, the switching operation controller 82 and the switch valve 76 cooperate together with the atmosphere 78 and the vacuum source 80 to provide an active pressure regulating mechanism for actively control active air pressure level in the working air chamber 50. By utilizing this active pressure regulating mechanism, the engine mount 98 is able to exhibit further enhanced vibration damping performance.

While the presently preferred embodiment of this invention has been described in detail for illustrative purpose only, it is to be understood that the present invention is not limited to the details of the illustrated embodiment.

In the illustrated embodiments, the pressure fluctuation transmitting mechanism is composed of the movable plate member in the form of the movable rubber plate 62 whose amount of displacement is restricted, and the movable rubber plate 62 is substantially freely displaceable in its thickness direction within the limited stroke range. Instead of the movable rubber plate 62, it is possible to employ a rubber elastic layer fixedly supported by the partition member 34 or the like at its part, and undergo elastic deformation to permit pressure transmission between the primary fluid chamber 36 and the medial chamber 70.

Figure 15:
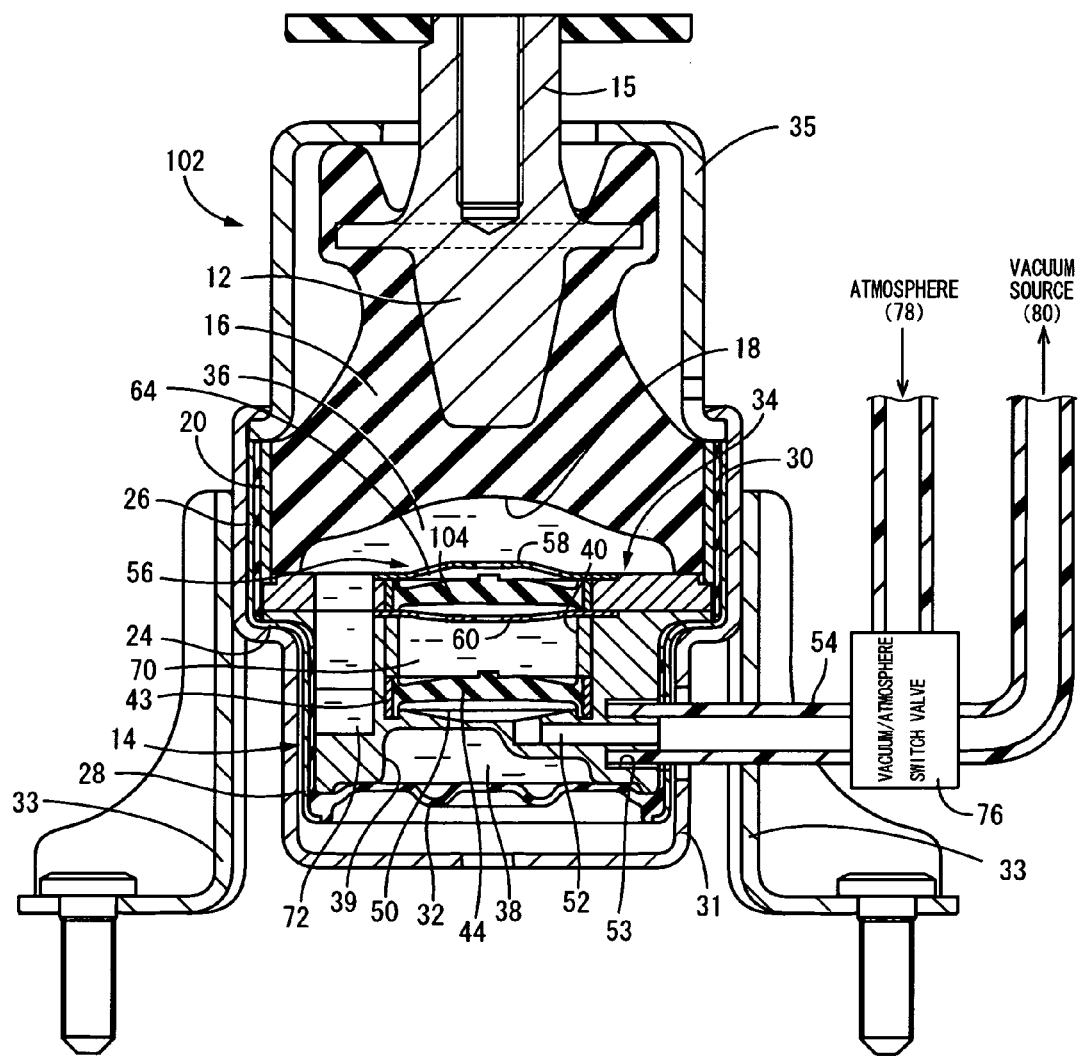
FIG. 15 is an elevational view in axial or vertical cross section of an automotive engine mount of construction according to a fifth embodiment of a fluid-filled vibration damping device of the present invention.

As one specific example, FIG. 15 illustrate an engine mount 102 having a rubber elastic layer instead of the movable rubber plate 62. For the sake of facility of interpretation, the same reference numerals as used in the first embodiment will be used in this embodiment to identify the structurally or functionally corresponding components. This engine mount 102 adopts a rubber elastic layer 104 of disk-like shape. This rubber elastic layer 104 is bonded at its peripheral portion to a fixing ring 105 through vulcanization of a rubber material for forming thereof. The fixing ring 105 is press fitted into the central recess 40 of the partition member 34 so that the rubber elastic layer 104 is fixedly bonded at its peripheral portion to the open end portion of the central recess 40. This arrangement permits transmission of fluid pressure fluctuation between the primary fluid chamber 36 and the medial chamber 70 based on elastic deformation of the central portion of the rubber elastic layer 104 caused by difference between both fluid pressures in both chambers 36, 70 exerted on opposite faces of the rubber elastic layer 104.

The rubber elastic layer 104 may be adapted to restrict pressure transmission amount between the primary fluid chamber 36 and the medial chamber 70 by limiting an amount of its elastic deformation per se. Alternatively, the rubber elastic layer 104 may be further accurately restricted in an amount of its elastic deformation by boding a canvas or the like thereto. In the engine mount 102 shown in FIG. 15, the upper and lower support plates 58, 60 are disposed on the opposite sides of the rubber elastic layer 104 with a given axial spacing therebetween, so that the rubber elastic layer 104 is brought into abutting contact with the upper and lower support plates 58, 60, thereby restricting an amount of elastic deformation of the rubber elastic layer 104.

The rubber elastic layer 104 employed in the present embodiment is similar to the movable rubber plate 62 in structure, making it easy to manufacture the same. Preferably, the upper and lower support plates 58, 60 are provided for limiting elastic deformation of the rubber elastic layer 104, while the rubber elastic layer 104 is made more readily to deformation or small in dynamic spring constant than the movable rubber plate 62, by suitably adjusting rubber materials or the like. With this arrangement, when the engine mount 102 subjected to medium frequency and medium amplitude vibration, fluid pressure fluctuation generated in the primary fluid chamber 36 is effectively exerted on the medial chamber 70 via the rubber elastic layer 104, even if the working air chamber 50 is exposed to the atmosphere 78, and fluid pressure fluctuation generated in the medial chamber 70 is not absorbed by the rubber elastic layer 104, but effectively excited owing to wall spring stiffness of the rubber elastic layer 104. Thus, a sufficient amount of fluid flow through the second orifice passage 74 will be obtained, so that the engine mount 104 is able to enjoy vibration damping effect owing to the second orifice passage 74.

Figure 16:
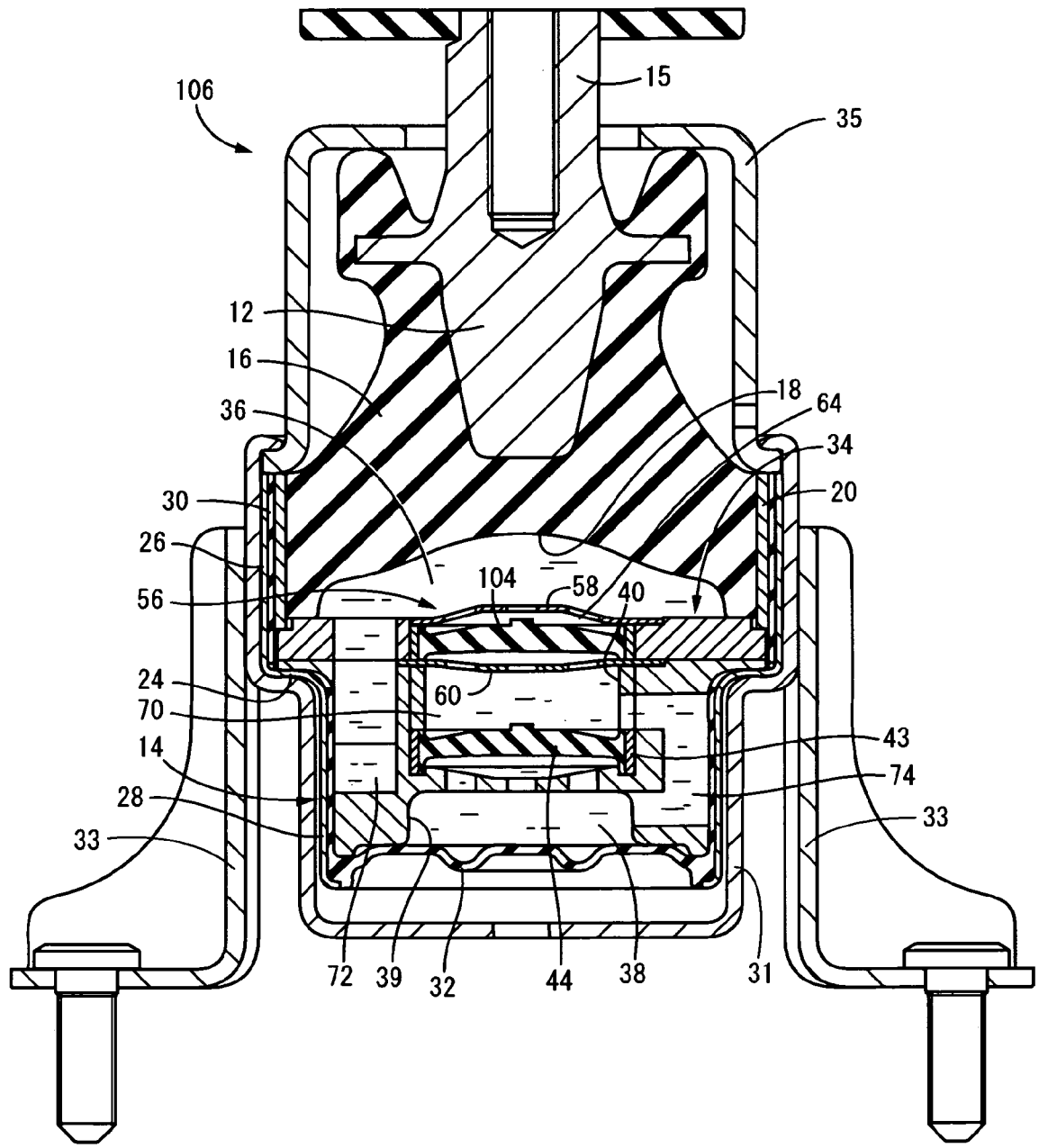
FIG. 16 is an elevational view in axial or vertical cross section of an automotive engine mount of construction according to a sixth embodiment of a fluid-filled vibration damping device of the present invention.

In the engine mount 90 of passive type according to the third embodiment of the invention, likewise the rubber elastic layer 104 may be employed instead of the rubber elastic plate 44, as shown in FIG. 16. The same reference numerals as used in the third embodiment will be used in this embodiment to identify the structurally or functionally corresponding components.

It should be appreciated that the present invention is not limited to the illustrated embodiments, in terms of structures of the first and second orifice passages 72, 74, tuning frequencies of these orifice passages, structures of the pressure fluctuation transmitting mechanism, structures of the rubber elastic plate 44 and the rubber elastic layer 104 for limiting pressure transmitting capacity, and the amount of restriction thereof, and specific structure of these pressure regulating rubber plates. These specific features may be suitably variable depending on required vibration damping performance or the size of the mount.

While the present invention as applied to automotive engine mounts has been described in the illustrated embodiments, the present invention is equally applicable to various other vibration damping devices for use in various kinds of vibrative members requiring vibration damping effect for a plurality of frequency ranges or over a wide frequency range.

It is also to be understood that the present invention may be embodied with various other changes, modifications and improvements, which may occur to those skilled in the art, without departing from the spirit and scope of the invention defined in the following claims.

What is claimed is:

1. A fluid-filled vibration damping device comprising:
   a first mounting member;
   a second mounting member disposed spaced away from the first mounting member;
   a rubber elastic body elastically connecting the first and second mounting member together;
   a pressure receiving chamber partially defined by the rubber elastic body and filled with a non-compressible fluid, the pressure receiving chamber undergoing fluid pressure fluctuation during input of vibration to the device;
   an equilibrium chamber partially defined by a flexible layer for permitting a volume change thereof and filled with the non-compressible fluid;
   a first orifice passage permitting a fluid communication between the pressure receiving chamber and the equilibrium chamber, and being tuned to a first frequency range;
   a medial chamber disposed between the pressure receiving chamber and the equilibrium chamber, and filled with the non-compressible fluid;
   a second orifice passage permitting a fluid communication between the equilibrium chamber and the medial chamber, and being tuned to a second frequency range higher than the first frequency range;
   a pressure fluctuation transmitting mechanism disposed between the pressure receiving chamber and the medial chamber for permitting a restricted pressure fluctuation transmission between the pressure receiving chamber and the medial chamber owing to restrictive displacement or deformation of a movable member thereof; and
   a pressure regulating rubber plate partially defining the medial chamber and regulating fluid pressure fluctuation in the medial chamber owing to an elastic deformation thereof, wherein
   the equilibrium chamber is situated on a side opposite from the medial chamber with the pressure regulating rubber plate partially defining the medial chamber interposed therebetween.

2. A fluid-filled vibration damping device according to claim 1, wherein the pressure regulating rubber plate partially defining the medial chamber is exposed to an atmosphere at a surface thereof opposite from the medial chamber.

3. A fluid-filled vibration damping device according to claim 1, further comprising a working air chamber situated on a side opposite from the medial chamber with the pressure regulating rubber plate partially defining the medial chamber interposed therebetween.

4. A fluid-filled vibration damping device according to claim 3, further comprising an air passage connected to the working air chamber, and an air pressure regulating apparatus externally regulate air pressure in the working air chamber via the air passage.

5. A fluid-filled vibration damping device according to claim 4, wherein the air pressure regulating apparatus includes a static pressure varying device for variably setting spring characteristics of the pressure regulating rubber plate by regulating a static pressure level in the working air chamber.

6. A fluid-filled vibration damping device according to claim 4, wherein the air pressure regulating apparatus includes an active pressure regulating device for applying active air pressure fluctuation to the working air chamber by regulating active air pressure level in the working air chamber and thereby oscillating the pressure regulating rubber plate.

7. A fluid-filled vibration damping device according to claim 1, wherein said vibration damping device is adapted to undergo input of at least three kinds of vibration including low frequency and high amplitude vibration, medium frequency and medium amplitude vibration, high frequency and small amplitude vibration, wherein the first orifice passage is tuned to the low frequency and large amplitude vibration so that the vibration damping device exhibits vibration damping effect with respect to the low frequency and large amplitude vibration on the basis of flow action of the fluid flowing through the first orifice passage, wherein the pressure fluctuation transmitting mechanism is tuned to the medium frequency and medium amplitude vibration so that fluid pressure fluctuation excited in the pressure receiving chamber during input of the medium frequency and medium amplitude vibration is transmitted to the medial chamber, while the fluid pressure fluctuation excited in the pressure receiving chamber during input of the low frequency and large amplitude vibration is not transmitted to and released to the medial chamber, wherein the second orifice passage is tuned to the medium frequency and medium amplitude vibration so that the vibration damping device exhibits vibration damping effect with respect to the medium frequency and medium amplitude vibration on the basis of flow action of the fluid flowing through the second orifice passage, and wherein the pressure regulating rubber plate is tuned to the high frequency and small amplitude vibration so that fluid pressure fluctuation transmitted from the pressure receiving chamber to the medial chamber through the pressure fluctuation transmitting mechanism during input of high frequency and small amplitude vibration is absorbed due to elastic deformation of the pressure regulating rubber plate, while the fluid pressure fluctuation transmitted from the pressure receiving chamber to the medial chamber through the pressure fluctuation transmitting mechanism during input of medium frequency and medium amplitude vibration is not absorbed and not released from the medial chamber since the elastic deformation of the pressure regulating rubber plate is restricted.

8. A fluid-filled vibration damping device according to claim 7, wherein the vibration damping device is provided for use as an engine mount for an automotive vehicle, and one of the first and second mounting member is adapted to be fixed to an power unit of the vehicle, while an other of the first and second mounting members is adapted to be fixed to a body of the vehicle, and wherein the low frequency and large amplitude vibration includes engine shake, the medium frequency and medium amplitude vibration includes engine idling vibration, and the high frequency and small amplitude vibration includes booming noise.

9. A fluid-filled vibration damping device according to claim 1, wherein the second mounting member is of cylindrical tubular configuration, the first mounting member is situated on a side of one open end of the second mounting member with a spacing therebetween, the rubber elastic body is disposed between and elastically connects the first and second mounting member with the one open end of the second mounting member fluid-tightly closed by means of the rubber elastic body, an other open end of the second mounting member is fluid-tightly closed by the flexible layer, the partition member is supported by the second mounting member to be situated between the rubber elastic body and the flexible layer so that the pressure receiving chamber is defined between the partition member and the rubber elastic body while the equilibrium chamber is defined between the partition member and the flexible layer, the medial chamber is formed within the partition member, the partition member at least partially defines the first orifice passage and the second orifice passage, and the pressure fluctuation transmitting mechanism and the pressure regulating rubber plate are incorporated with the partition member.

10. A fluid-filled vibration damping device comprising:
a first mounting member;
a second mounting member disposed spaced away from the first mounting member;
a rubber elastic body elastically connecting the first and second mounting member;
a pressure receiving chamber partially defined by the rubber elastic body and filled with a non-compressible fluid, the pressure receiving chamber undergoing fluid pressure fluctuation during input of vibration to the device;
an equilibrium chamber partially defined by a flexible layer for permitting a volume change thereof and filled with the non-compressible fluid;
a first orifice passage permitting a fluid communication between the pressure receiving chamber and the equilibrium chamber, and being tuned to a first frequency range;
a medial chamber disposed between the pressure receiving chamber and the equilibrium chamber, and filled with the non-compressible fluid;
a second orifice passage permitting a fluid communication between the equilibrium chamber and the medial chamber, and being tuned to a second frequency range higher than the first frequency range;
a pressure fluctuation transmitting mechanism disposed between the pressure receiving chamber and the medial chamber for permitting a restricted pressure fluctuation transmission between the pressure receiving chamber and the medial chamber owing to restrictive displacement or deformation of a movable member thereof; and
a pressure regulating rubber plate partially defining the medial chamber and regulating fluid pressure fluctuation in the medial chamber owing to an elastic deformation thereof, wherein
the movable member of the pressure fluctuation transmitting mechanism comprises a movable plate member of plane shape, the movable plate member being disposed between the pressure receiving chamber and the medial chamber such that an amount of displacement of the movable plate member in a thickness direction thereof is restricted, and fluid pressure in the pressure receiving chamber is exerted on a first surface of the movable plate member while fluid pressure in the medial chamber is exerted on an other surface of the movable plate member.

* * * * *